United States Patent
Kwon et al.

(10) Patent No.: US 10,291,327 B1
(45) Date of Patent: May 14, 2019

(54) OPTICAL SIGNAL GENERATING APPARATUS AND OPERATING METHOD THEREOF

(71) Applicant: ELECTRONICS AND TELECOMMUNICATIONS RESEARCH INSTITUTE, Daejeon (KR)

(72) Inventors: O-Kyun Kwon, Daejeon (KR); Namje Kim, Daejeon (KR); Miran Park, Daejeon (KR); Shinmo An, Daejeon (KR); Won Seok Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/855,825

(22) Filed: Dec. 27, 2017

(30) Foreign Application Priority Data

Nov. 29, 2017 (KR) .................. 10-2017-0162246
Dec. 22, 2017 (KR) .................. 10-2017-0178771

(51) Int. Cl.
*H04B 10/07* (2013.01)
*H04B 10/40* (2013.01)
(Continued)

(52) U.S. Cl.
CPC ....... *H04B 10/54* (2013.01); *H04B 10/25752* (2013.01); *H04B 10/07* (2013.01);
(Continued)

(58) Field of Classification Search
None
See application file for complete search history.

(56) References Cited

U.S. PATENT DOCUMENTS

| 7,978,390 B2 | 7/2011 | Kikuchi | |
| 9,964,431 B1 * | 5/2018 | Moore | ..................... G01H 9/00 |

(Continued)

FOREIGN PATENT DOCUMENTS

| KR | 10-2014-0061129 A | 5/2014 |
| KR | 10-2014-0122355 A | 10/2014 |

*Primary Examiner* — Darren E Wolf
(74) *Attorney, Agent, or Firm* — Rabin & Berdo, P.C.

(57) ABSTRACT

An optical signal generating apparatus according to an embodiment of the inventive concept includes a first optical intensity modulator for modulating a first optical signal to generate a $2^N$-level (where N is a positive integer) second optical signal in the form of a binary signal, a first optical amplifier for amplifying the second optical signal to generate a third optical signal, and a second optical intensity modulator for modulating the third optical signal to generate a $2^{N+1}$-level fourth optical signal in the form of a binary signal. The optical signal generating apparatus according to an embodiment of the inventive concept may generate a low-cost, high-quality optical signal by using an optical device to generate a multi-level optical signal. Additionally, the optical signal generating apparatus according to an embodiment of the inventive concept may generate a multi-level optical signal by sequentially performing optical modulation and optical amplification operations.

20 Claims, 16 Drawing Sheets

(51) Int. Cl.
*H04B 10/50* (2013.01)
*H04B 10/54* (2013.01)
*H04B 10/60* (2013.01)
*H04B 10/077* (2013.01)
*H04B 10/2575* (2013.01)

(52) U.S. Cl.
CPC ........ *H04B 10/077* (2013.01); *H04B 10/0775* (2013.01); *H04B 10/40* (2013.01); *H04B 10/50* (2013.01); *H04B 10/60* (2013.01)

(56) References Cited

U.S. PATENT DOCUMENTS

| | | | |
|---|---|---|---|
| 2007/0212076 A1* | 9/2007 | Roberts | G02F 1/0121 398/183 |
| 2014/0133870 A1 | 5/2014 | Lee et al. | |
| 2014/0161469 A1 | 6/2014 | Krause et al. | |
| 2014/0301736 A1 | 10/2014 | Huh et al. | |
| 2015/0125161 A1 | 5/2015 | Secondini et al. | |
| 2017/0111118 A1 | 4/2017 | Franck et al. | |
| 2017/0117863 A1* | 4/2017 | Tanaka | H04B 10/501 |
| 2018/0034551 A1* | 2/2018 | Nishihara | H04B 10/548 |

* cited by examiner

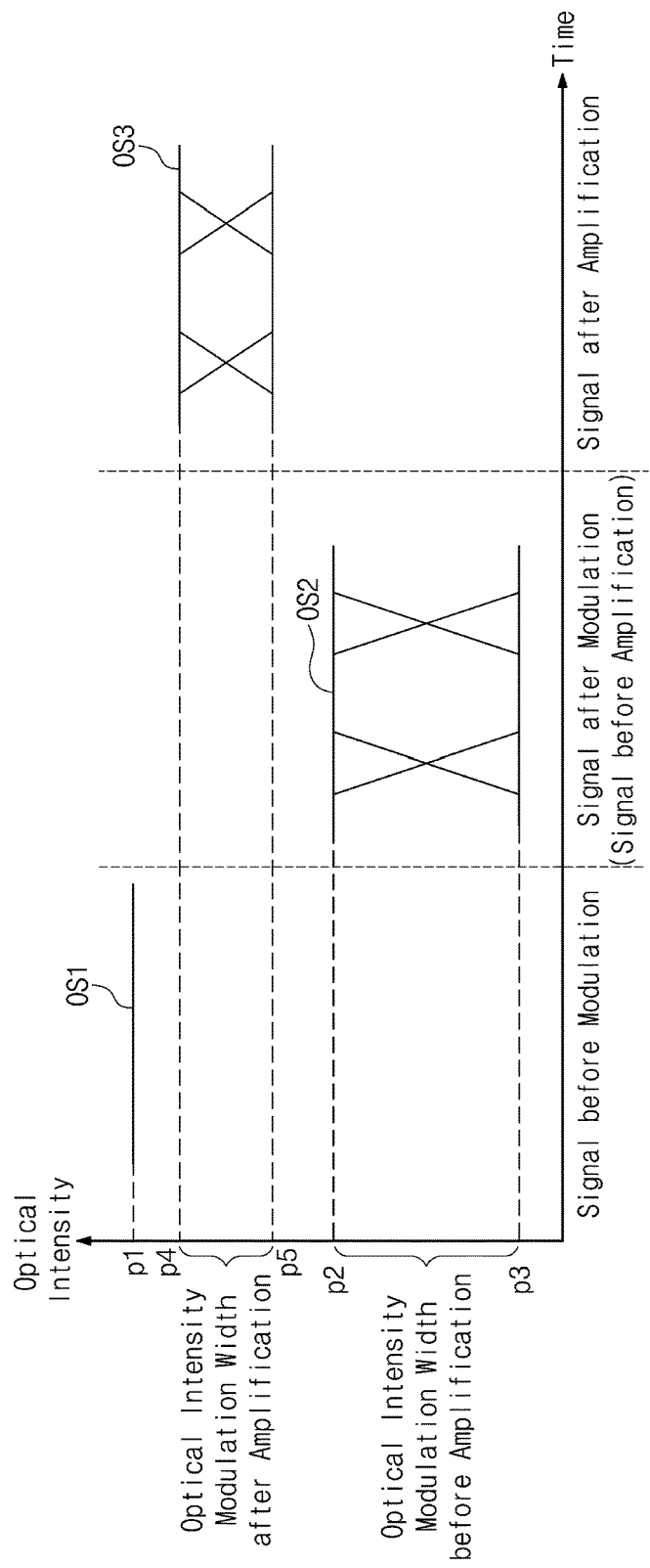

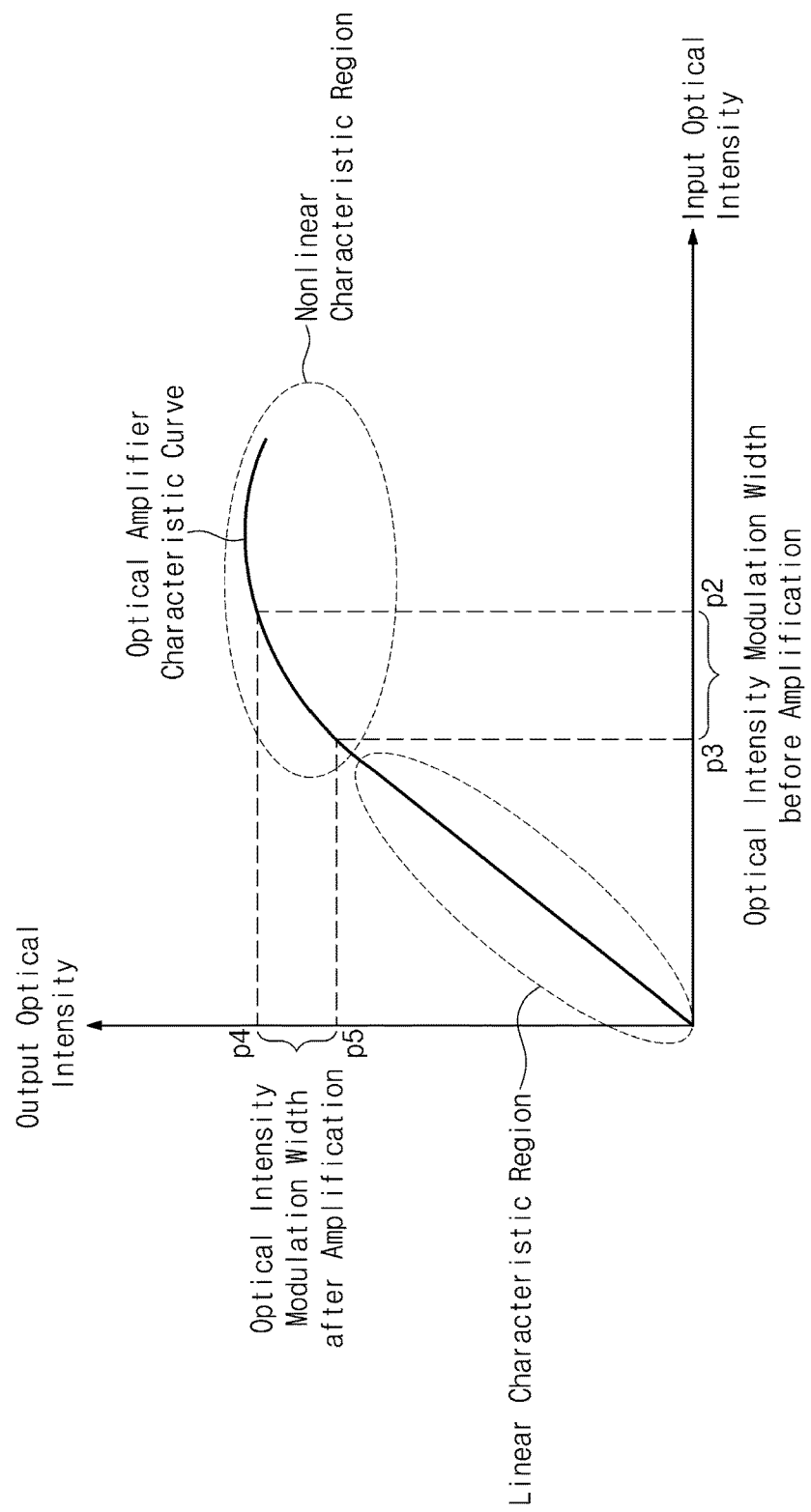

OPTICAL SIGNAL GENERATING APPARATUS AND OPERATING METHOD THEREOF

CROSS-REFERENCE TO RELATED APPLICATION

This U.S. non-provisional patent application claims priority under 35 U.S.C. § 119 of Korean Patent Application No. 10-2017-0162246, filed on Nov. 29, 2017, the entire contents of which are hereby incorporated by reference.

BACKGROUND

The present invention relates to an optical signal generating apparatus, and more particularly, to an optical signal generating apparatus for converting an electrical signal into an optical signal in an optical transceiver module used in an optical network and an operating method thereof.

Optical communication technologies require large-capacity, high-efficiency communication means as wired and wireless convergence services expand. In order to step up the speed and capacity of such optical networks, put to use are optical techniques of a time division multiplexing (TDM) scheme for increasing the speed of an individual channel and a wavelength division multiplexing (WDM) scheme for making extensive use of optical frequency resources.

Additionally, multi-level optical signal modulation techniques based on Ethernet are being studied to connect data centers. A pulse amplitude modulation (PAM) technique is used as one of the multi-level optical signal modulation techniques. A PAM optical signal modulator involves a digital-to-analog converter (DAC) for converting a binary electrical signal, which is a digital signal, into an analog signal.

High costs can be caused by digital-to-analog conversion components of an electrical signal that are required in next-generation communication technologies based on large capacities.

SUMMARY

The present disclosure provides an optical signal generating apparatus that generates a multi-level optical signal by using an optical device instead of digital-to-analog conversion components of an electrical signal, and an operating method thereof.

An embodiment of the inventive concept provides an optical signal generating apparatus including: a first optical intensity modulator configured to modulate a first optical signal to generate a $2^N$-level (where N is a positive integer) second optical signal in the form of a binary signal; a first optical amplifier configured to amplify the second optical signal to generate a third optical signal; and a second optical intensity modulator configured to modulate the third optical signal to generate a $2^{N+1}$-level fourth optical signal in the form of a binary signal.

In an embodiment, the first optical intensity modulator may be configured to operate on the basis of a first bias voltage and a first RF voltage, and the second optical intensity modulator may be configured to operate on the basis of a second bias voltage equal to the first bias voltage and a second RF voltage having an amplitude equal to an amplitude of the first RF voltage.

In an embodiment, an optical intensity modulation width of the fourth optical signal may be equal to an optical intensity modulation width of the second optical signal.

In an embodiment, the first optical amplifier may be configured to reshape the second optical signal so that an optical intensity modulation width of the third optical signal becomes one-half of an optical intensity modulation width of the second optical signal.

In an embodiment, the first optical amplifier may operate on the basis of an input current, and a magnitude of the input current may be a magnitude of current that causes the first optical amplifier to operate in a nonlinear characteristic region.

In an embodiment, the first optical intensity modulator may be configured to operate on the basis of a first bias voltage and a first RF voltage, and the second optical intensity modulator may be configured to operate on the basis of a second bias voltage different from the first bias voltage and a second RF voltage having an amplitude different from an amplitude of the first RF voltage.

In an embodiment, the amplitude of the second RF voltage may be half the amplitude of the first RF voltage.

In an embodiment, the first optical amplifier may operate on the basis of an input current, and a magnitude of the input current may be a magnitude of current that causes the first optical amplifier to operate in a linear characteristic region.

In an embodiment, the highest-level optical intensity of the third optical signal may be equal to an optical intensity of the first optical signal.

In an embodiment, the optical signal generating apparatus according to an embodiment of the inventive concept may further include a second optical amplifier configured to amplify the fourth optical signal to generate a fifth optical signal, and a third optical intensity modulator configured to modulate the fifth optical signal to generate a $2^{N+2}$-level sixth optical signal in the form of a binary signal.

In an embodiment, the first optical intensity modulator may be configured to operate on the basis of a first bias voltage and a first RF voltage; the second optical intensity modulator may be configured to operate on the basis of a second bias voltage and a second RF voltage; and the third optical intensity modulator may be configured to operate on the basis of a third bias voltage and a third RF voltage, wherein the first bias voltage, the second bias voltage, and the third bias voltage are equal, and the first RF voltage, the second RF voltage, and the third RF voltage have equal amplitudes.

In an embodiment, the first optical amplifier may be configured to reshape the second optical signal so that an optical intensity modulation width of the third optical signal becomes one-half of an optical intensity modulation width of the second optical signal; and the second optical amplifier may be configured to reshape the fourth optical signal so that an optical intensity modulation width of the fifth optical signal becomes one-fourth of an optical intensity modulation width of the fourth optical signal.

In an embodiment, the first optical intensity modulator may be configured to operate on the basis of a first bias voltage and a first RF voltage; the second optical intensity modulator may be configured to operate on the basis of a second bias voltage and a second RF voltage; and the third optical intensity modulator may be configured to operate on the basis of a third bias voltage and a third RF voltage, wherein the first bias voltage, the second bias voltage, and the third bias voltage are different from each other, and the first RF voltage, the second RF voltage, and the third RF voltage have amplitudes different from each other.

In an embodiment, an amplitude of the second RF voltage may be one-half of an amplitude of the first RF voltage, and an amplitude of the third RF voltage may be one-half of an amplitude of the second RF voltage.

In an embodiment, each of the first optical intensity modulator and the second optical intensity modulator may be a Mach-Zehnder optical intensity modulator or an electro-absorption modulator.

An embodiment of the inventive concept provides an operating method of an optical signal generating apparatus, the operating method including: modulating a first optical signal to generate a $2^N$-level (where N is a positive integer) second optical signal in the form of a binary signal; amplifying the second optical signal to generate a third optical signal; and modulating the third optical signal to generate a $2^{N+1}$-level fourth optical signal in the form of a binary signal.

In an embodiment, the first optical signal may be modulated on the basis of a first bias voltage and a first RF voltage, and the third optical signal may be modulated on the basis of a second bias voltage equal to the first bias voltage and a second RF voltage having an amplitude equal to an amplitude of the first RF voltage.

In an embodiment, the first optical signal may be modulated on the basis of a first bias voltage and a first RF voltage, and the third optical signal may be modulated on the basis of a second bias voltage different from the first bias voltage and a second RF voltage having an amplitude different from an amplitude of the first RF voltage.

In an embodiment, the second optical signal may be amplified on the basis of an input current, and a magnitude of the input current may be a magnitude of current that causes an optical intensity modulation width of the third optical signal to be different from an optical intensity modulation width of the second optical signal.

In an embodiment, the second optical signal may be amplified on the basis of an input current, and a magnitude of the input current may be a magnitude of current that causes an optical intensity modulation width of the third optical signal to be equal to an optical intensity modulation width of the second optical signal.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to describe principles of the inventive concept. In the drawings:

FIGS. 4A and 4B illustrate, by way of example, an operation of an optical amplifier according to an embodiment of the inventive concept;

DETAILED DESCRIPTION

Hereinafter, embodiments of the inventive concept are described in more detail with reference to the accompanying figures. In the following description, specific details such as detailed configurations and structures are described to provide more general understandings of the embodiments of the inventive concept. Therefore, various changes and modifications to the embodiments of the inventive concept can be made by those skilled in the art within the spirit and scope of the inventive concept. Additionally, descriptions of well-known functions and structures are omitted for clarity and brevity. The terms used in the following description are defined in consideration of the functions of the inventive concept, and are not limited to specific functions. Thus, the definition of the terms can be determined on the basis of the detailed description.

Modules in the following figures or detailed description can be connected to others in addition to the components illustrated in the figures or described in the detailed description. Each of the connections between modules or components can be direct or indirect. Each of the connections between the modules or components can be a communication connection or a physical connection.

Components described with reference to terms such as unit, module and layer used in the detailed description can be implemented in the form of software, hardware, or a combination thereof. By way of example, the software may be machine code, firmware, embedded code, or application software. For example, the hardware may include an electrical circuit, an electronic circuit, a processor, a computer, an integrated circuit, integrated circuit cores, a pressure sensor, an inertial sensor, a micro electro mechanical system (MEMS), a passive device, or a combination thereof.

Unless otherwise defined, all terms including technical or scientific meaning used in this specification have general meaning understood by those skilled in the art to which the inventive concept pertains. In general, terms defined in a dictionary are interpreted to have meaning equivalent to the contextual meaning in the related art and are not to be interpreted as having ideal or overly formal meaning unless explicitly defined in the specification.

Figure 1:
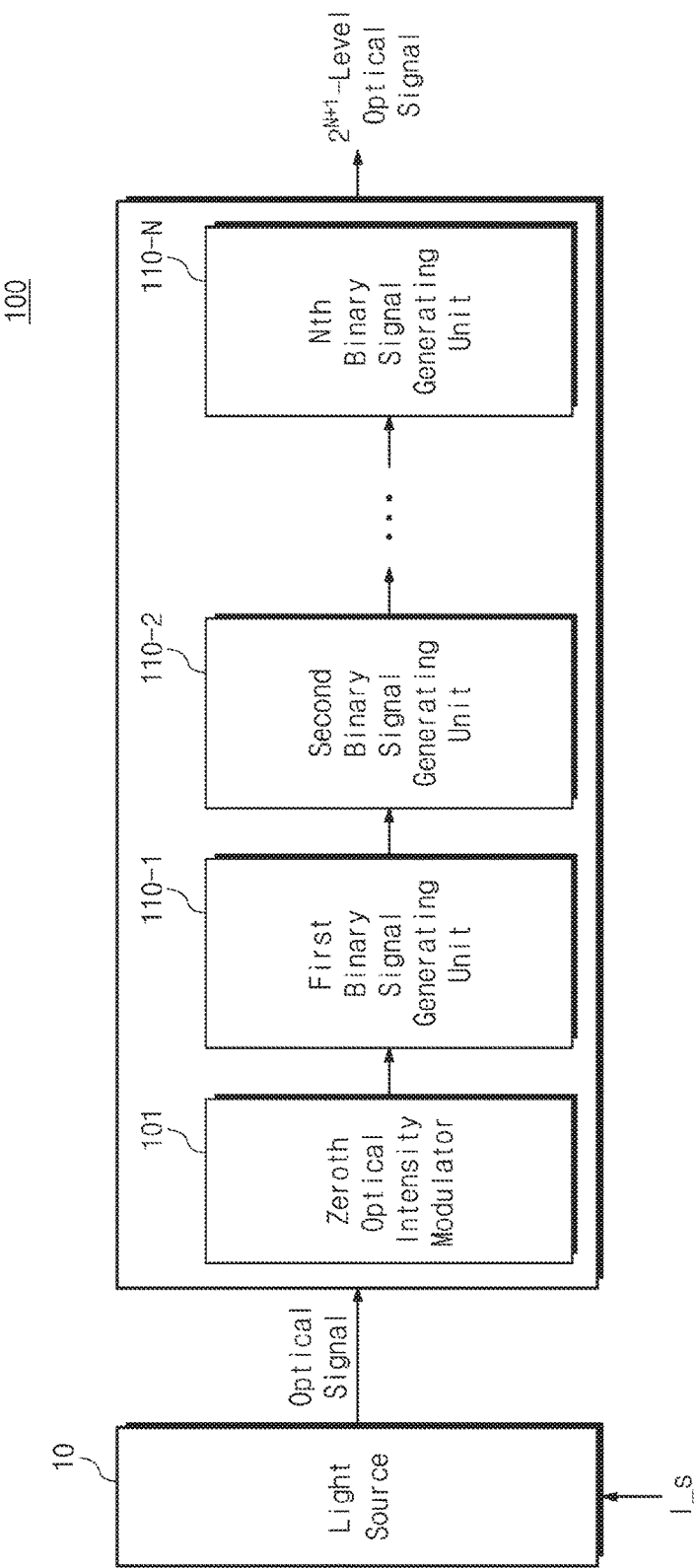
FIG. 1 schematically illustrates an optical signal generating apparatus according to an embodiment of the inventive concept.

FIG. 1 schematically illustrates an optical signal generating apparatus according to an embodiment of the inventive concept. Referring to FIG. 1, a light source 10 may generate an optical signal from a current I_s. The light source 10 may output an optical signal of a constant intensity and transmit the same to an optical signal generating apparatus 100.

The optical signal generating apparatus 100 may receive an optical signal from the light source 10, and modulate the received optical signal to generate a $2^{N+1}$-level (N is an integer of 1 or more) (or multi-level) optical signal. That is, the optical signal generated from the optical signal generating apparatus 100 may represent one of $2^{N+1}$ levels. Accordingly, the optical signal generating apparatus 100 may generate an optical signal capable of representing $2^{N+1}$ values.

The optical signal generating apparatus 100 may include a zeroth optical intensity modulator 101 and at least one binary signal generating unit 110. The zeroth optical intensity modulator 101 may receive an optical signal of a constant intensity from the light source 10 and modulate optical intensity. The zeroth optical intensity modulator 101 may generate an optical signal in the form of a binary signal (hereinafter, referred to as binary optical signal) by modulating the optical intensity. That is, the zeroth optical intensity modulator 101 may generate, from the optical signal of a single level, a two-level optical signal having a high level (for example, "1") value and a low level (for example, "0") value.

The binary signal generating unit 110 may receive and amplify an optical signal, and modulate the amplified optical signal to generate a binary optical signal. By way of example, the binary signal generating unit 110 may reshape the optical signal. When the optical signal is reshaped, an optical intensity modulation width of the binary optical signal may vary.

A first binary signal generating unit 110-1 may receive the two-level optical signal from the zeroth optical intensity modulator 101. The first binary signal generating unit 110-1 may generate, from the optical signal representing two levels, a binary optical signal representing four levels.

A second binary signal generating unit 110-2 may receive the four-level optical signal from the first binary signal generating unit 110-1. The second binary signal generating unit 110-2 may generate, from the optical signal representing four levels, a binary optical signal representing eight levels.

An (N)th binary signal generating unit 110-N may receive a $2^N$-level optical signal from an (N−2)th binary signal generating unit (not illustrated). The (N)th binary signal generating unit 110-N may generate, from the optical signal representing $2^N$ levels, a binary optical signal representing $2^{N+1}$ levels.

As illustrated in FIG. 1, the zeroth optical intensity modulator 101 and the at least one binary signal generating unit 110 may be connected in series, and sequentially modulate an optical signal to generate a multi-level optical signal. Accordingly, the optical signal generating apparatus 100 may generate a $2^{N+1}$-level optical signal through N binary signal generating units, and generate a multi-level optical signal through one optical intensity modulator and the at least one binary signal generating unit.

The optical signal generating apparatus according to an embodiment of the inventive concept may receive an optical signal generated from the separate light source 10 as illustrated in FIG. 1, but the inventive concept is not limited thereto. For example, the optical signal generating apparatus according to an embodiment of the inventive concept may include a light source and generate an optical signal in the optical signal generating apparatus.

Hereinafter, for convenience of description, the optical signal generating apparatus is assumed to receive an optical signal from a separate light source.

Figure 2:
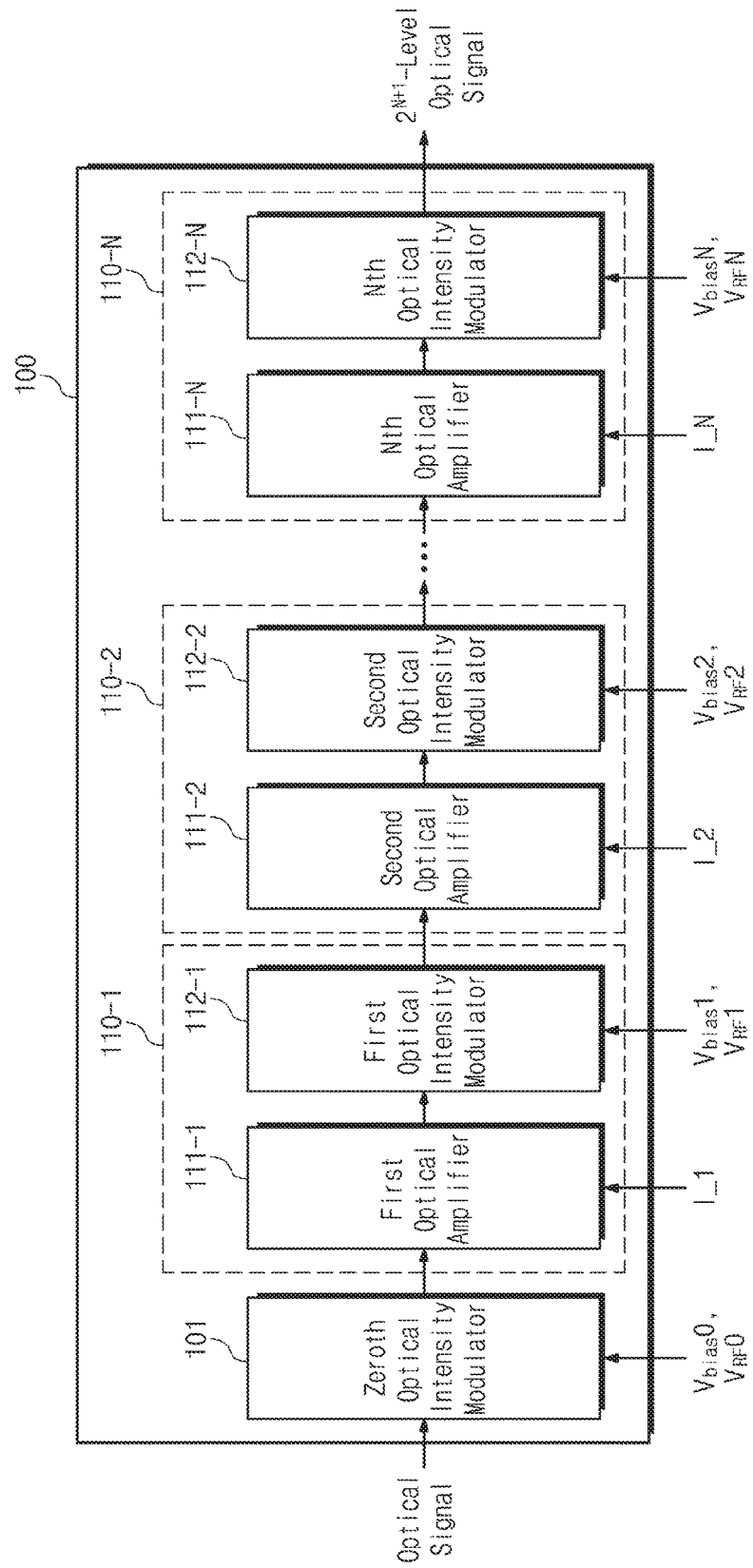
FIG. 2 is a block diagram illustrating the optical signal generating apparatus illustrated in FIG. 1.

FIG. 2 is a block diagram illustrating the optical signal generating apparatus illustrated in FIG. 1. Referring to FIGS. 1 and 2, the optical signal generating apparatus 100 may include the zeroth optical intensity modulator 101 and the at least one binary signal generating unit 110. The binary signal generating unit 110 may include an optical amplifier 111 and an optical intensity modulator 112.

The optical intensity modulators 101 and 112 may be implemented using an electro-absorption modulator (EAM), a Mach-Zehnder optical intensity modulator or the like.

The optical intensity modulators 101 and 112 may modulate a received optical signal on the basis of a bias voltage $V_{bias}$ and an RF voltage $V_{RF}$. The bias voltage $V_{bias}$ is a direct current (DC) voltage, and may be related to a reference operating point of the optical intensity modulator. The RF voltage $V_{RF}$ may be related to an optical intensity modulation width of a binary optical signal generated by modulating the optical signal. By way of example, the RF voltage $V_{RF}$ may be an alternating current (AC) voltage or an electrical binary signal. For example, an optical intensity reference value of the generated binary optical signal may be determined depending on the bias voltage $V_{bias}$, and the optical intensity modulation width of the binary optical signal may vary depending on the RF voltage $V_{RF}$.

The optical amplifier 111 may amplify the intensity of a received optical signal on the basis of a current I. The optical amplifier 111 may reshape the optical signal by adjusting an optical intensity depth of the binary optical signal on the basis of the current I.

The zeroth optical intensity modulator 101 may receive a zeroth bias voltage $V_{bias}0$, a zeroth RF voltage $V_{RF}0$, and an optical signal. The zeroth optical intensity modulator 101 may modulate the received optical signal to generate a binary optical signal, on the basis of the zeroth bias voltage $V_{bias}0$ and the zeroth RF voltage $V_{RF}0$. The binary optical signal generated by the zeroth optical intensity modulator 101 may be a two-level optical signal.

A first optical amplifier 111-1 may receive a first current I_1, and the optical signal generated from the zeroth optical intensity modulator 101. The first optical amplifier 111-1 may amplify the received optical signal on the basis of the first I_1. The first optical amplifier 111-1 may reshape the received optical signal on the basis of the first I_1.

A first optical intensity modulator 112-1 may receive a first bias voltage $V_{bias}1$, a first RF voltage $V_{RF}1$, and the amplified optical signal from the first optical amplifier 111-1. The first optical intensity modulator 112-1 may modulate the received optical signal to generate a binary optical signal, on the basis of the first bias voltage $V_{bias}1$ and the first RF voltage $V_{RF}1$. The binary optical signal generated by the first optical intensity modulator 112-1 may be a four-level optical signal.

As in the first optical amplifier 111-1, a second optical amplifier 111-2 may amplify and reshape the received optical signal on the basis of a second current I_2. Additionally, an (N)th optical amplifier 111-N may amplify and reshape a received optical signal on the basis of an (N)th current I_N.

As in the first optical intensity modulator 112-1, a second optical intensity modulator 112-2 may modulate a received optical signal to generate an eight-level optical signal, on the basis of a second bias voltage $V_{bias}2$ and a second RF voltage $V_{RF}2$. Additionally, an (N)th optical intensity modulator 112-N may modulate a received optical signal to generate a $2^{N+1}$-level optical signal, on the basis of an (N)th bias voltage $V_{bias}N$ and an (N)th RF voltage $V_{RF}N$.

By way of example, magnitudes of the zeroth to (N)th bias voltages $V_{bias}0$ to $V_{bias}N$ may be equal, and magnitudes of amplitudes of the zeroth to (N)th RF voltages $V_{RF}0$ to $V_{RF}N$ may be equal. In this case, optical intensity modulation widths of the binary optical signals generated by the zeroth to (N)th optical intensity modulators 101 to 112-N may be equal.

By way of example, the magnitudes of the zeroth to (N)th bias voltages $V_{bias}0$ to $V_{bias}N$ may be different, and the magnitudes of the amplitudes of the zeroth to (N)th RF voltages $V_{RF}0$ to $V_{RF}N$ may be different. In this case, the optical intensity modulation widths of the binary optical signals generated by the zeroth to (N)th optical intensity modulators 101 to 112-N may be different.

As illustrated in FIGS. 1 and 2, the optical signal generating apparatus 100 may include N binary signal generating units. However, the optical signal generating apparatus 100 is not limited with respect to the number of the binary signal generating units, and thus, may generate a multi-level optical signal (e.g. a four-level optical signal) through, for example, a single binary signal generating unit.

Figure 3A:
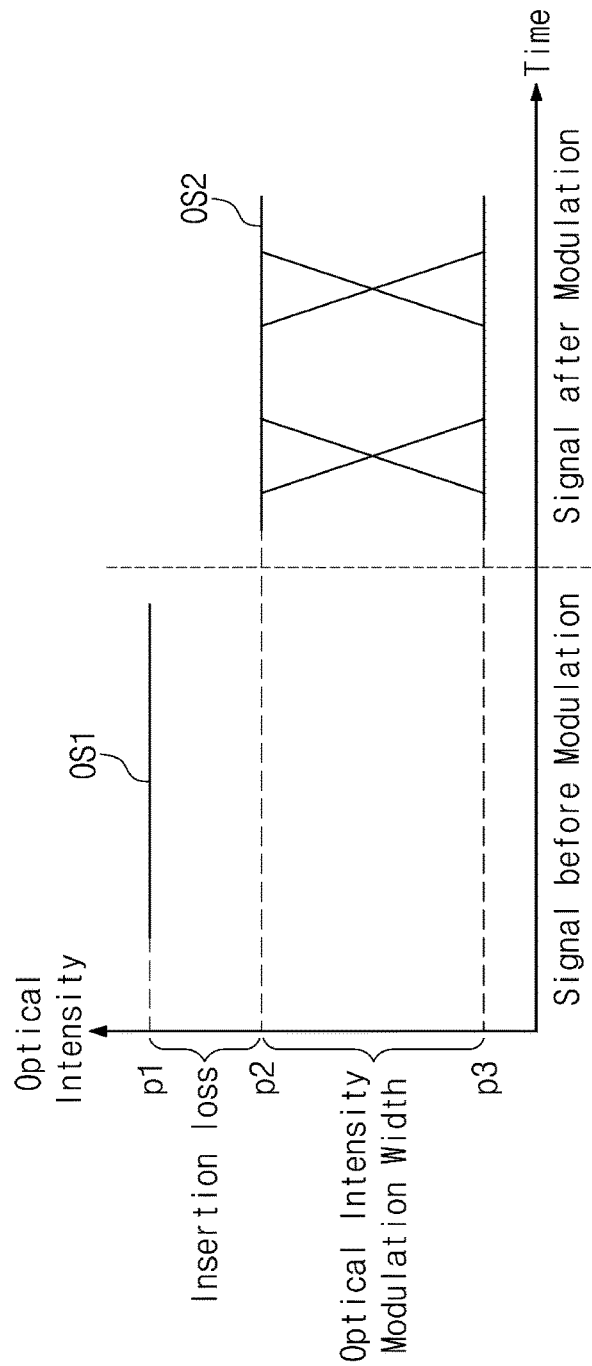
FIGS. 3A and 3B illustrate, by way of example, a modulation operation of an optical intensity modulator according to an embodiment of the inventive concept.
Figure 3B:
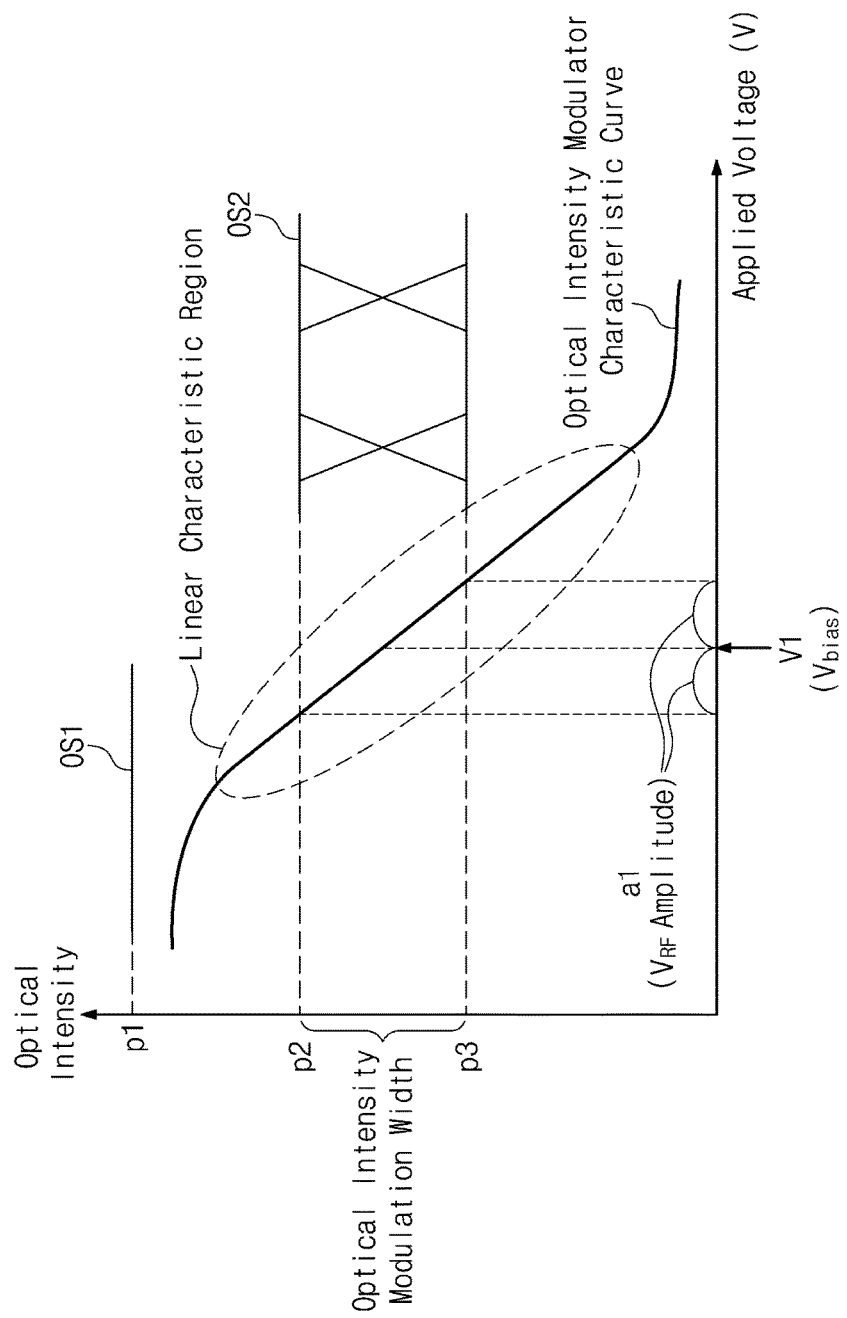

FIGS. 3A and 3B illustrate, by way of example, a modulation operation of the optical intensity modulator according to an embodiment of the inventive concept. Specifically, FIG. 3A illustrates an example in which the zeroth optical intensity modulator 101 modulates a received optical signal into a binary optical signal, and FIG. 3B illustrates an example in which the zeroth optical intensity modulator 101 modulates the received optical signal into the binary optical signal depending on the bias voltage $V_{bias}$ and the RF voltage $V_{RF}$. For convenience of description, the optical intensity modulator according to an embodiment of the inventive concept is described with reference to the zeroth optical intensity modulator 101, but other optical intensity modulators 112-1 to 112-N may operate similarly.

Referring to FIG. 3A, a horizontal axis of FIG. 3A represents time and a vertical axis thereof represents optical intensity. The optical intensity of the vertical axis represents relative magnitude of the optical intensity of an output optical signal to the optical intensity of an input optical signal, and may not mean absolute optical intensity. Similarly, optical intensity illustrated in the following figures may represent relative magnitude of optical intensity.

The zeroth optical intensity modulator 101 may modulate a received first optical signal OS1 to generate a second optical signal OS2. By way of example, the generated second optical signal OS2 may be in the form of a binary signal. For example, the second optical signal OS2 may represent a value of "1" when having a higher optical intensity (i.e., p2), and may represent a value of "0" when having a lower optical intensity (i.e., p3).

As illustrated in FIG. 3A, the optical signal modulated through the zeroth optical intensity modulator 101 may have a reduced optical intensity due to insertion loss. For example, a second optical intensity p2 of the modulated second optical signal OS2 may become lower than a first optical intensity p1 of the first optical signal OS1 by the insertion loss.

Referring to FIG. 3B, a horizontal axis of FIG. 3B represents applied voltage and a vertical axis thereof represents optical intensity. FIG. 3B illustrates an optical intensity response characteristic depending on voltages applied to the zeroth optical intensity modulator 101. The zeroth optical intensity modulator 101 may operate on the basis of an optical intensity modulator characteristic curve. By way of example, the response characteristic (i.e., the optical intensity modulator characteristic curve) of the zeroth optical intensity modulator 101 may vary according to the structure and design of the zeroth optical intensity modulator 101, and the response characteristic of the zeroth optical intensity modulator 101 may be predetermined.

The applied voltages of FIG. 3B may be the bias voltage $V_{bias}$ and the RF voltage $V_{RF}$. A bias voltage $V_{bias}$ having a first voltage V1 and an RF voltage $V_{RF}$ having a first amplitude a1 may be applied to the zeroth optical intensity modulator 101. In this case, the zeroth optical intensity modulator 101 may generate a second optical signal OS2 having the second optical intensity p2 and a third optical intensity p3 from the first optical signal OS1 having the first optical intensity p1.

The generated second optical signal OS2 may be determined on the basis of the optical intensity modulator characteristic curve. As illustrated in FIG. 3B, a reference point of a modulated optical intensity may vary depending on the bias voltage $V_{bias}$. For example, when the bias voltage $V_{bias}$ becomes smaller, the modulated optical intensity may become higher, and when the bias voltage $V_{bias}$ becomes larger, the modulated optical intensity may become lower.

Additionally, an optical intensity modulation width of the generated optical signal may vary depending on the amplitude of the RF voltage $V_{RF}$. For example, when the amplitude of the RF voltage $V_{RF}$ becomes larger, the optical intensity modulation width may become larger, and when the amplitude of the RF voltage $V_{RF}$ becomes smaller, the optical intensity modulation width may become smaller.

By way of example, the bias voltage $V_{bias}$ and the RF voltage $V_{RF}$ may be applied so that the zeroth optical intensity modulator 101 may operate in a linear characteristic region of the optical intensity modulator characteristic curve. When the zeroth optical intensity modulator 101 operates in the linear characteristic region, the optical intensity modulation width may be easily controlled by adjusting the applied bias voltage $V_{bias}$ and RF voltage $V_{RF}$.

FIGS. 4A and 4B illustrate, by way of example, an operation of an optical amplifier according to an embodiment of the inventive concept. Specifically, FIG. 4A illustrates an example in which the first optical amplifier 111-1 amplifies a received optical signal, and FIG. 4B illustrates an example for describing a method of determining the extent of optical amplification outputted from the first optical amplifier 111-1. For convenience of description, the optical amplifier according to an embodiment of the inventive concept is described with reference to the first optical amplifier 111-1, but other optical amplifiers 111-2 to 111-N may operate similarly.

Referring to FIG. 4A, a horizontal axis represents time and a vertical axis represents optical intensity. The first optical signal OS1 may be modulated into the second optical signal OS2 by the zeroth optical intensity modulator 101, and the optical intensity of the second optical signal OS2 may be amplified by the first optical amplifier 111-1 to generate a third optical signal OS3.

By the first optical amplifier 111-1, the second optical intensity p2 of the second optical signal OS2 may be amplified to a fourth optical intensity p4 of the third optical signal OS3, and the third optical intensity p3 of the second optical signal OS2 may be amplified to a fifth optical intensity p5 of the third optical signal OS3.

The first optical amplifier 111-1 may not only perform amplification of optical intensity, but also change the optical intensity modulation width of the generated optical signal (i.e., reshape the optical signal). Accordingly, optical intensity modulation widths before and after amplification may be different. For example, the first optical amplifier 111-1 may amplify an optical signal so that the optical intensity modulation widths before and after the amplification are equal. Alternatively, the first optical amplifier 111-1 may amplify an optical signal so that the optical intensity modulation width after the amplification becomes smaller than that before the amplification.

Referring to FIG. 4B, a horizontal axis represents input optical intensity and a vertical axis represents output optical intensity. The first optical amplifier 111-1 may amplify the optical intensity of an inputted optical signal on the basis of an optical amplifier characteristic curve. According to the optical amplifier characteristic curve, the second optical intensity p2 may be amplified to the fourth optical intensity p4, and the third optical intensity p3 may be amplified to the fifth optical intensity p5.

The optical amplifier characteristic curve may have a linear characteristic region and a nonlinear characteristic region (or saturation region). When optical intensity is amplified in the linear characteristic region, output optical intensity may be determined in proportion to input optical intensity. Optical intensity modulation widths before and after the amplification may be equal. Accordingly, when an optical signal is only amplified, the optical amplifier may operate in the linear characteristic region.

When optical intensity is amplified in the nonlinear characteristic region, output optical intensity may not be proportionate to input optical intensity. An optical intensity modulation width after the amplification may become smaller than that before the amplification. Accordingly, when an optical signal is reshaped, the optical amplifier may operate in the nonlinear characteristic region.

The first optical amplifier 111-1 may perform amplification operation on the basis of an input current. When the input current changes, an operation characteristic of the first optical amplifier 111-1 may change. In other words, the optical amplifier characteristic curve illustrated in FIG. 4B may be changed. For example, the input current may determine whether the first optical amplifier 111-1 operates in the linear or nonlinear characteristic region. Accordingly, depending on the input current, the first optical amplifier 111-1 may amplify an optical signal in the linear or nonlinear characteristic region.

Figure 5:
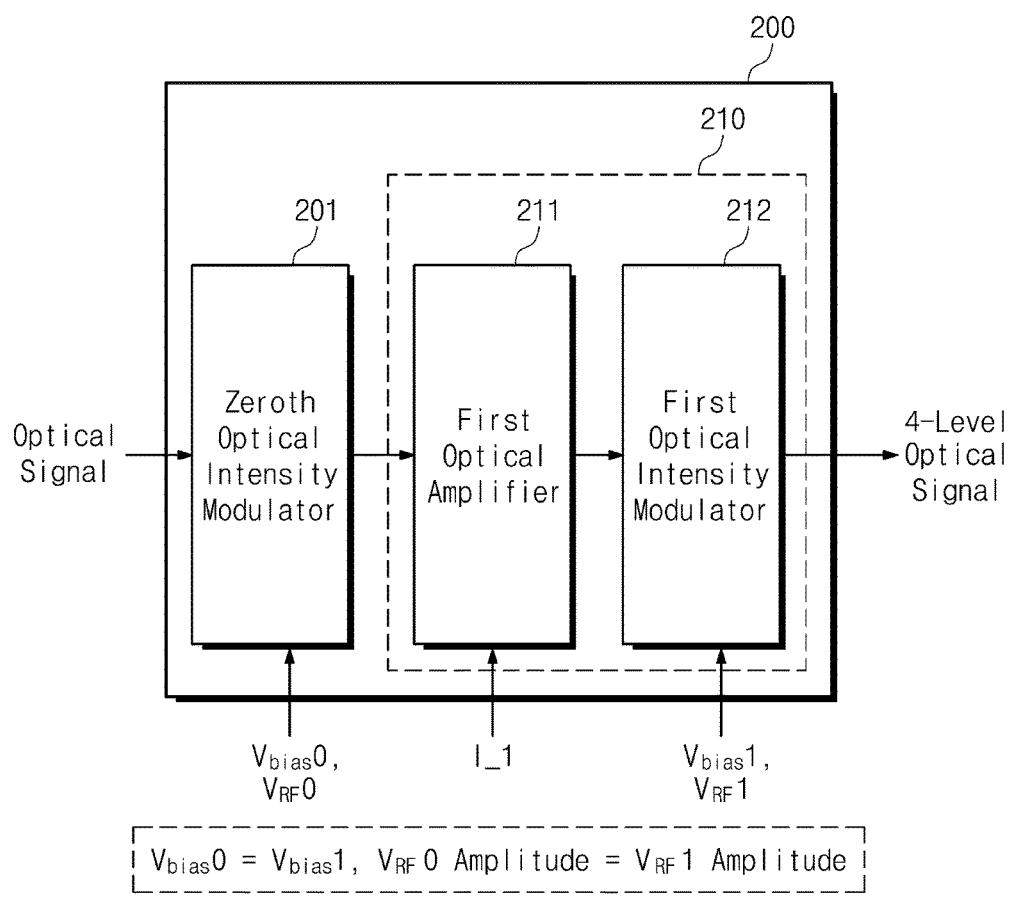
FIG. 5 is a block diagram illustrating an optical signal generating apparatus according to an embodiment of the inventive concept.

FIG. 5 is a block diagram illustrating an optical signal generating apparatus according to an embodiment of the inventive concept. Referring to FIG. 5, an optical signal generating apparatus 200 may receive an optical signal to output a four-level optical signal. The optical signal generating apparatus 200 may include a zeroth optical intensity modulator 201 and a binary signal generating unit 210. The binary signal generating unit 210 may include a first optical amplifier 211 and a first optical intensity modulator 212. Because the zeroth optical intensity modulator 201, the first optical amplifier 211 and the first optical intensity modulator 212 perform operations similar to those of the optical intensity modulators and the optical amplifiers described in FIGS. 1 to 4B, detailed description thereof will not be given.

The zeroth optical intensity modulator 201 may operate on the basis of a zeroth bias voltage $V_{bias}0$ and a zeroth RF voltage $V_{RF}0$, and the first optical intensity modulator 212 may operate on the basis of a first bias voltage $V_{bias}1$ and a first RF voltage $V_{RF}1$. The zeroth bias voltage $V_{bias}0$ and the first bias voltage $V_{bias}1$ may be equal, and amplitudes of the zeroth RF voltage $V_{RF}0$ and the first RF voltage $V_{RF}1$ may be equal. That is, the zeroth optical intensity modulator 201 and the first optical intensity modulator 212 may be operated by the equal bias voltages $V_{bias}$ and the RF voltages $V_{RF}$ having the equal amplitudes.

As illustrated in FIG. 3B, when the bias voltages $V_{bias}$ applied to the zeroth and first optical intensity modulators 201 and 212 are equal, and amplitudes of the RF voltages $V_{RF}$ applied thereto are equal, optical signals having equal optical intensity modulation widths may be generated. Accordingly, an optical intensity modulation width of an optical signal generated by the zeroth optical intensity modulator 201 may be equal to that of an optical signal generated by the first optical intensity modulator 212.

The first optical amplifier 211 may receive a first current I_1, and amplify and reshape the optical signal received from the zeroth optical intensity modulator 201. The first optical amplifier 211 may amplify and reshape the received optical signal so that intervals between adjacent signal levels of the four-level optical signal outputted from the optical signal generating apparatus 200 are equal. As illustrated in FIG. 4B, the first optical amplifier 211 may operate in a nonlinear characteristic region so as to amplify and reshape a received optical signal. Accordingly, the first current I_1 may be a current that causes the first optical amplifier 211 to operate in the nonlinear characteristic region.

By way of example, when the first optical amplifier 211 reshapes the inputted optical signal, an output optical intensity modulation width may be one-half of an input optical intensity modulation width.

The first optical intensity modulator 212 may modulate an amplified and reshaped two-level optical signal to generate the four-level optical signal. Accordingly, the optical signal generating apparatus 200 may output the four-level optical signal (i.e., a multi-level optical signal).

Figure 6:
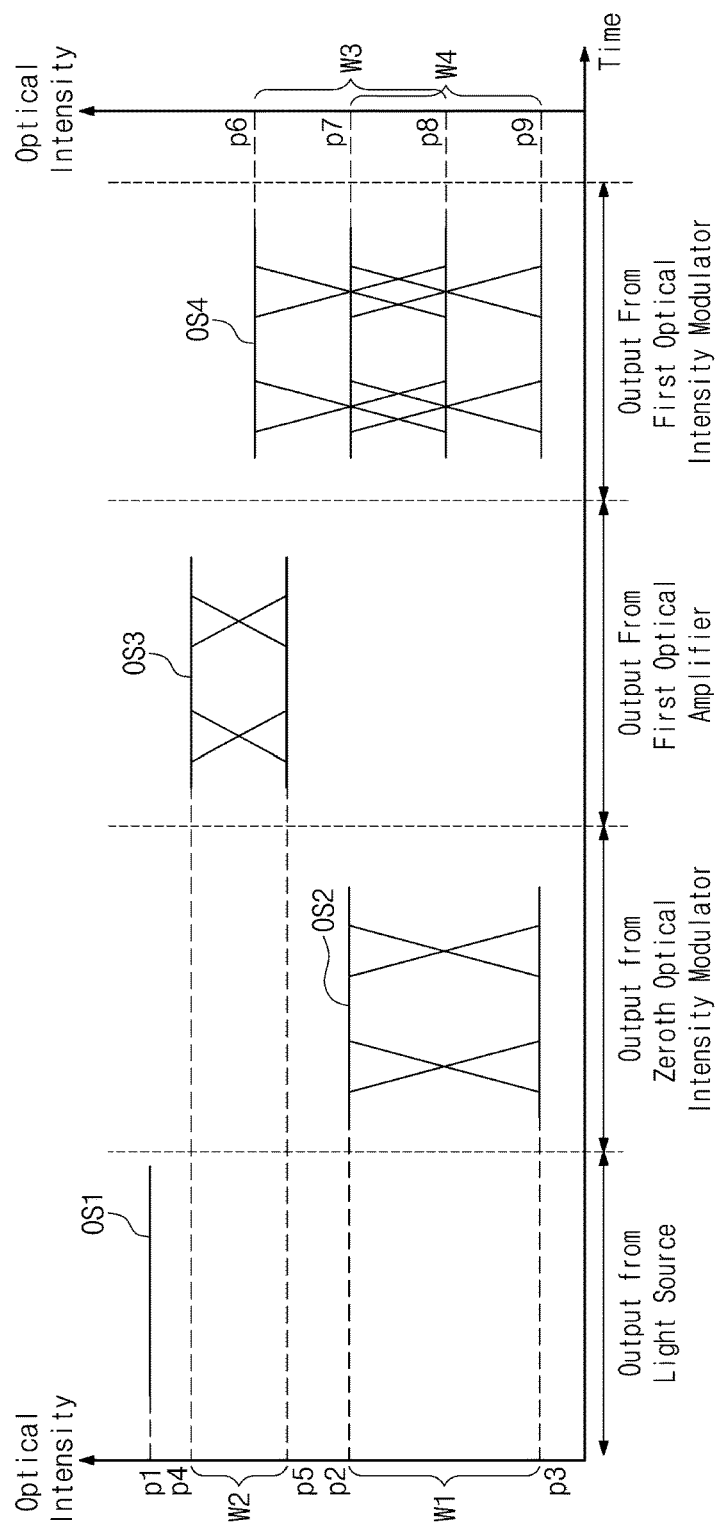
FIG. 6 illustrates, by way of example, an optical signal output of the optical signal generating apparatus illustrated in FIG. 5.

FIG. 6 illustrates, by way of example, an optical signal output of the optical signal generating apparatus illustrated in FIG. 5. A horizontal axis of FIG. 6 represents time and a vertical axis thereof represents optical intensity. Referring to FIGS. 5 and 6, the zeroth optical intensity modulator 201 may modulate a first optical signal OS1 to generate a second optical signal OS2. A two-level second optical signal OS2 having a second optical intensity p2 and a third optical intensity p3 may be generated from a first optical signal OS1 having a first optical intensity p1. The zeroth optical intensity modulator 201 may generate the second optical signal OS2 having a first optical intensity modulation width W1, on the basis of the zeroth bias voltage $V_{bias}0$ and the zeroth RF voltage $V_{RF}0$.

The first optical amplifier 211 may amplify the second optical signal OS2 to generate a third optical signal OS3. The first optical amplifier 211 may generate the third optical signal OS3 on the basis of the first I_1. The third optical signal OS3 may be a two-level optical signal having a fourth optical intensity p4 and a fifth optical intensity p5.

The third optical signal OS3 may have a higher optical intensity and a smaller optical intensity modulation width than the second optical signal OS2. By way of example, even though illustrated differently in FIG. 6, the first optical amplifier 211 may amplify the second optical signal OS2 so that the fourth optical intensity p4 of the third optical signal OS3 becomes equal to the first optical intensity p1 of the first optical signal OS1. The first optical amplifier 211 may reshape the second optical signal OS2 so that a second optical intensity modulation width W2 of the third optical signal OS3 becomes half the first optical intensity modulation width W1.

The first optical intensity modulator 212 may modulate the third optical signal OS3 to generate a fourth optical signal OS4, on the basis of the first bias voltage $V_{bias}1$ and the first RF voltage $V_{RF}1$. The first bias voltage $V_{bias}1$ may be equal to the zeroth bias voltage $V_{bias}0$, and the amplitude of the first RF voltage $V_{RF}1$ may be equal to that of the zeroth RF voltage $V_{RF}0$.

The fourth optical signal OS4 may be a four-level optical signal having a sixth optical intensity p6, a seventh optical intensity p7, an eighth optical intensity p8 and a ninth optical intensity p9. The first optical intensity modulator 212 may generate the fourth optical signal OS4 having the sixth optical intensity p6 and the eighth optical intensity p8 from the third optical signal OS3 having the fourth optical intensity p4. The first optical intensity modulator 212 may generate the fourth optical signal OS4 having the seventh optical intensity p7 and the ninth optical intensity p9 from the third optical signal OS3 having the fifth optical intensity p5. That is, the first optical intensity modulator 212 may generate the four-level fourth optical signal OS4 from the two-level third optical signal OS3.

The first optical intensity modulator 212 may generate the fourth optical signal OS4 having a third optical intensity modulation width W3 from the third optical signal OS3 having the fourth optical intensity p4. The first optical intensity modulator 212 may generate the fourth optical signal OS4 having a fourth optical intensity modulation width W4 from the third optical signal OS3 having the fifth optical intensity p5. The third optical intensity modulation width W3 and the fourth optical intensity modulation width W4 may be equal, and the third optical intensity modulation width W3 and the fourth optical intensity modulation width W4 may be equal to the first optical intensity modulation width W1. Additionally, intervals of the optical intensities p6 to p9 of the fourth optical signal OS4 may be equal.

In this specification, the optical intensity modulation width may mean the optical intensity depth of a binary optical signal generated through the optical intensity modulator from a constant-level optical signal. Accordingly, the third optical intensity modulation width W3 or the fourth optical intensity modulation width W4 of the fourth optical signal OS4 may have meaning different from the intervals of the optical intensities p6 to p9 of the fourth optical signal OS4.

Figure 7:
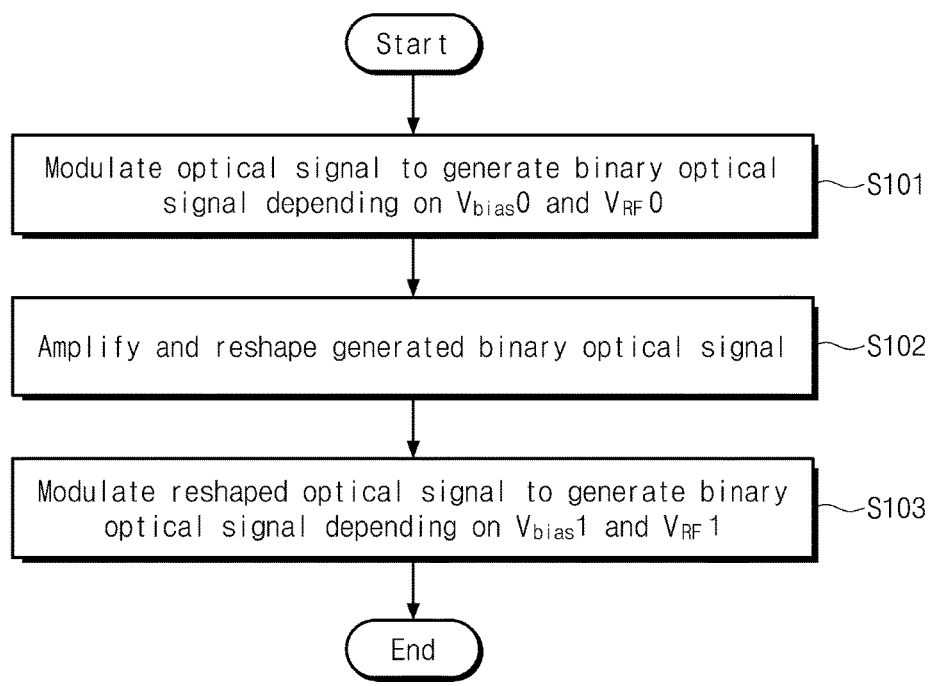
FIG. 7 is a flowchart illustrating an operating method of the optical signal generating apparatus illustrated in FIG. 5.

FIG. 7 is a flowchart illustrating an operating method of the optical signal generating apparatus illustrated in FIG. 5. In step S101, referring to FIGS. 5 and 7, an optical signal generating apparatus 200 may modulate, depending on a zeroth bias voltage $V_{bias}0$ and a zeroth RF voltage $V_{RF}0$, an optical signal to generate a binary optical signal. In step S102, the optical signal generating apparatus 200 may amplify and reshape the generated binary optical signal. In step S103, the optical signal generating apparatus 200 may modulate, depending on a first bias voltage $V_{bias}1$ and a first RF voltage $V_{RF}1$, the reshaped binary optical signal to generate a multi-level optical signal. The first bias voltage $V_{bias}1$ may be equal to the zeroth bias voltage $V_{bias}0$, and the amplitude of the first RF voltage $V_{RF}1$ may be equal to that of the zeroth RF voltage $V_{RF}0$.

The optical signal generating apparatus according to an embodiment of the inventive concept is not limited to what is illustrated in FIG. 7, and may generate an optical signal having more levels by repeating steps S102 and S103. For example, when steps S102 and S103 are performed N times, the optical signal generating apparatus may generate a $2^{N+1}$-level optical signal.

Figure 8:
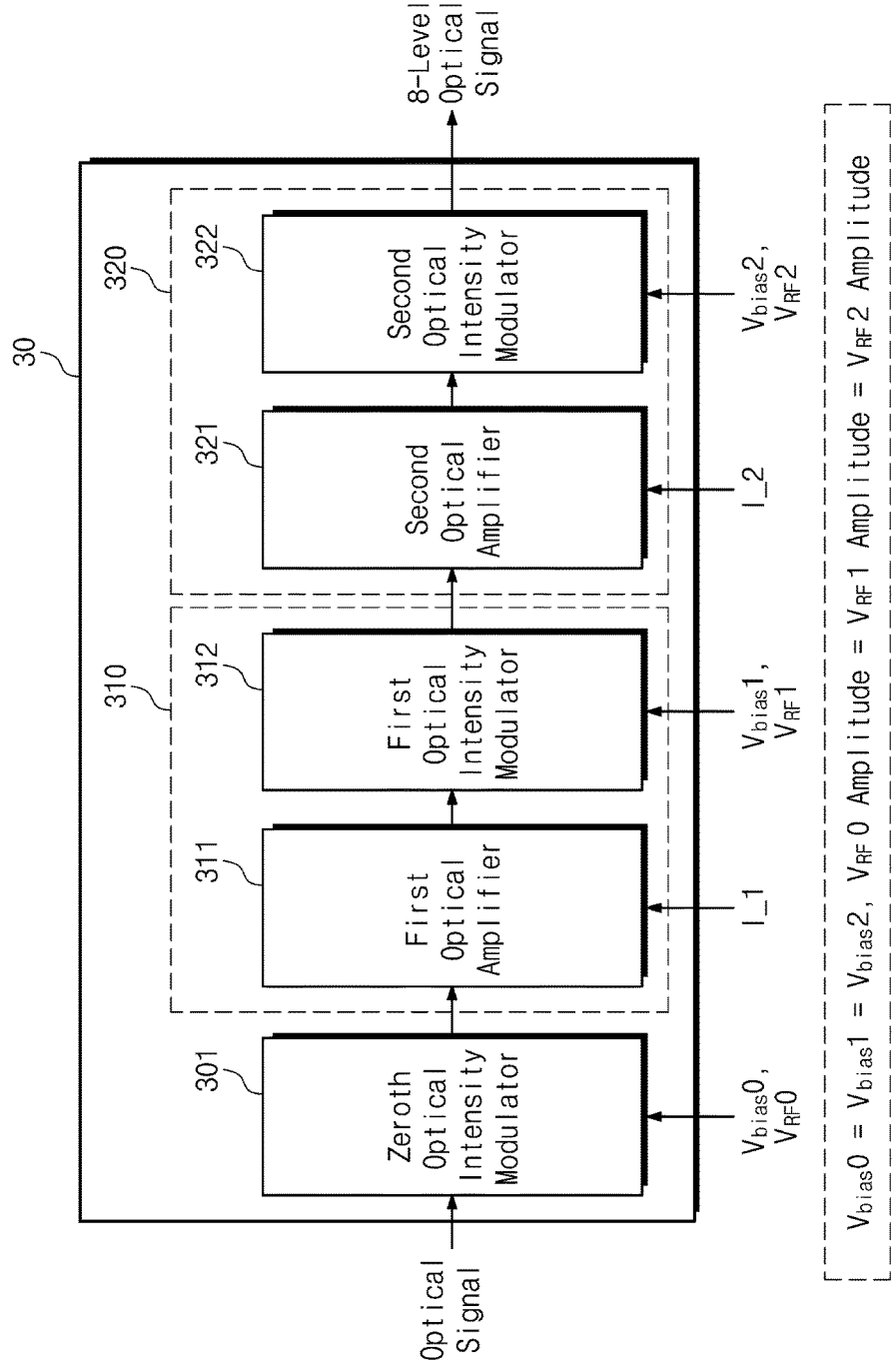
FIG. 8 is a block diagram illustrating an optical signal generating apparatus according to an embodiment of the inventive concept.

FIG. 8 is a block diagram illustrating an optical signal generating apparatus according to an embodiment of the inventive concept. An optical signal generating apparatus 300 may include a zeroth optical intensity modulator 301, a first binary signal generating unit 310 and a second binary signal generating unit 320. The first binary signal generating unit 310 may include a first optical amplifier 311 and a first optical intensity modulator 312, and the second binary signal generating unit 320 may include a second optical amplifier 321 and a second optical intensity modulator 322. Because operations of the zeroth optical intensity modulator 301 and the first binary signal generating unit 310 are similar to those of the zeroth optical intensity modulator 201 and the binary signal generating unit 210 of FIG. 5, detailed description will not be given.

The optical signal generating apparatus 300 may generate an eight-level optical signal through the zeroth optical intensity modulator 301 and the first and second binary signal generating units 310 and 320. Equal bias voltages (i.e., $V_{bias}0=V_{bias}1=V_{bias}2$) and RF voltages of equal amplitudes (i.e., $V_{RF}0=V_{RF}1=V_{RF}2$) may be applied to the zeroth optical intensity modulator 301, and the first and second optical intensity modulators 312 and 322. A first current I_1 and a second current I_2 may be respectively inputted to the first optical amplifier 311 and the second optical amplifier 321.

Figure 9:
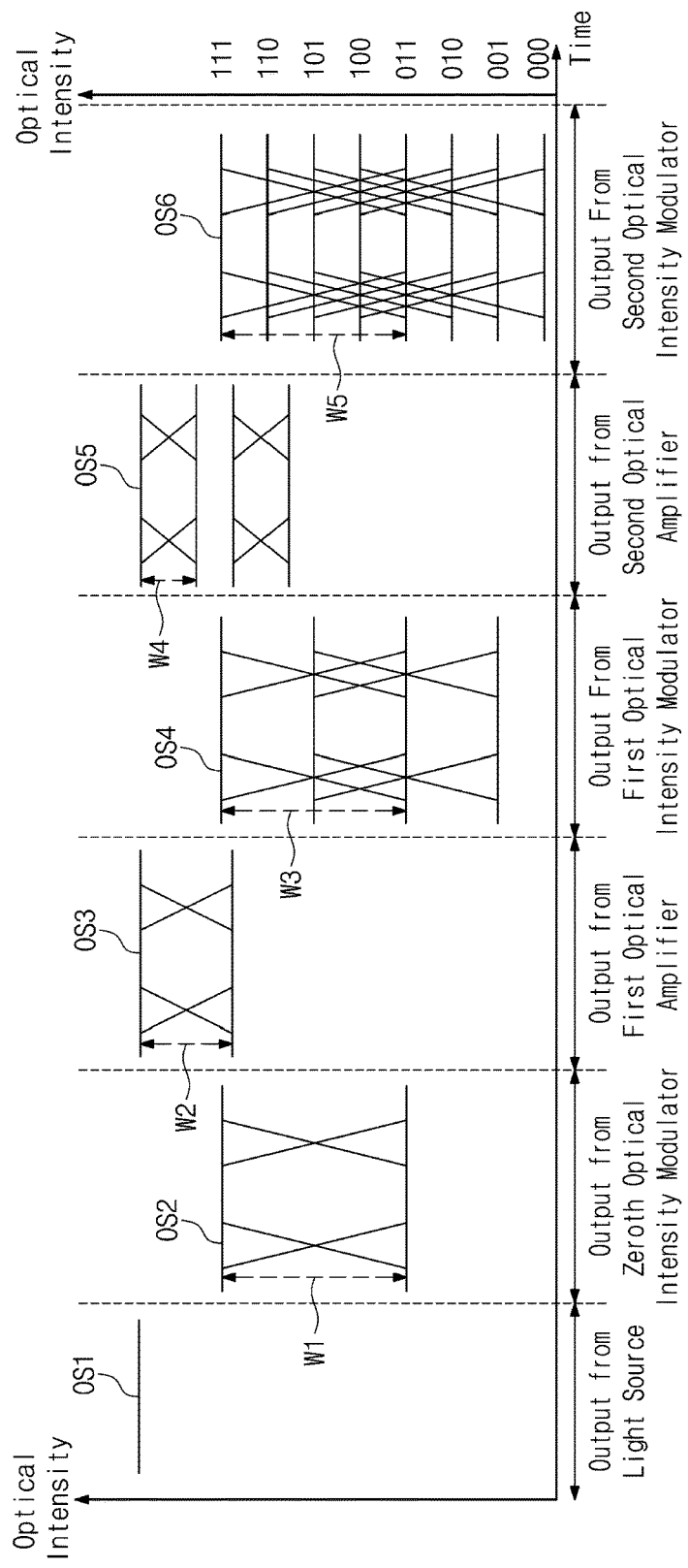
FIG. 9 illustrates, by way of example, an optical signal output of the optical signal generating apparatus illustrated in FIG. 8.

FIG. 9 illustrates, by way of example, an optical signal output of the optical signal generating apparatus illustrated in FIG. 8. A horizontal axis of FIG. 9 represents time and a vertical axis thereof represents optical intensity. Referring to FIGS. 8 and 9, the zeroth optical intensity modulator 301 may modulate, on the basis of the zeroth bias voltage $V_{bias}0$ and the zeroth RF voltage $V_{RF}0$, a first optical signal OS1 to generate a second optical signal OS2 having a first optical intensity modulation width W1.

The first optical amplifier 311 may amplify and reshape the second optical signal OS2 to generate a third optical signal OS3, on the basis of the first I_1. A second optical intensity modulation width W2 of the reshaped third optical signal OS3 may be different from the first optical intensity modulation width W1. By way of example, the second optical intensity modulation width W2 may be half the first optical intensity modulation width W1. The highest-level optical intensity of the third optical signal OS3 may be equal to the optical intensity of the first optical signal OS1.

The first optical intensity modulator 312 may modulate, on the basis of the first bias voltage $V_{bias}1$ and the first RF voltage $V_{RF}1$, the third optical signal OS3 to generate a fourth optical signal OS4 having a third optical intensity modulation width W3. The first bias voltage $V_{bias}1$ may be equal to the zeroth bias voltage $V_{bias}0$, and the amplitude of the first RF voltage $V_{RF}1$ may be equal to that of the zeroth RF voltage $V_{RF}0$. By way of example, the third optical intensity modulation width W3 may be equal to the first optical intensity modulation width W1, and intervals between adjacent signal levels of the fourth optical signal OS4 may be equal.

The second optical amplifier 321 may amplify and reshape the fourth optical signal OS4 to generate a fifth optical signal OS5, on the basis of the second current I_2. The fifth optical signal OS5 may have a fourth optical intensity modulation width W4 different from the third optical intensity modulation width W3. By way of example, the fourth optical intensity modulation width W4 may be one-fourth of the third optical intensity modulation width W3. Accordingly, the optical signal generating apparatus 300 according to an embodiment of the inventive concept may reshape an optical signal so that the optical intensity modulation width becomes further reduced as the optical signal amplification steps progress. For example, the optical signal generating apparatus 300 may reshape the optical signal modulation width to one-half in the first optical amplifier, to one-fourth in the second optical amplifier, and to one-eighth in the third optical amplifier. The highest-level optical intensity of the fifth optical signal OS5 may be equal to the highest-level optical intensity of the third optical signal OS3.

The second optical intensity modulator 322 may modulate, on the basis of the second bias voltage $V_{bias}2$ and the second RF voltage $V_{RF}2$, the fifth optical signal OS5 to generate a sixth optical signal OS6 having a fifth optical intensity modulation width W5. The second bias voltage $V_{bias}2$ may be equal to the zeroth bias voltage $V_{bias}0$, and the amplitude of the second RF voltage $V_{RF}2$ may be equal to that of the zeroth RF voltage $V_{RF}0$. By way of example, the fifth optical intensity modulation width W5 may be equal to the first and third optical intensity modulation widths W1 and W3, and intervals between adjacent signal levels of the sixth optical signal OS6 may be equal.

The optical signal generating apparatus 300 may output the sixth optical signal OS6 generated from the second optical intensity modulator 322. The optical signal generating apparatus 300 may output an eight-level optical signal therefrom. The eight-level optical signal outputted from the optical signal generating apparatus 300 may indicate values corresponding to bits assigned as in FIG. 9 and the following Table 1.

TABLE 1

| Eight-level optical signal | Value of the zeroth RF voltage of the zeroth optical intensity modulator | Value of the first RF voltage of the first optical intensity modulator | Value of the second RF voltage of the second optical intensity modulator |
|---|---|---|---|
| 000 | 0 | 0 | 0 |
| 001 | 1 | 0 | 0 |
| 010 | 0 | 1 | 0 |
| 011 | 1 | 1 | 0 |
| 100 | 0 | 0 | 1 |
| 101 | 1 | 0 | 1 |
| 110 | 0 | 1 | 1 |
| 111 | 1 | 1 | 1 |

As in Table 1, when the eight-level optical signal is received from the optical signal generating apparatus 300, a receiving terminal may recognize a value indicated by the optical signal depending on the optical signal level as one of "000" to "111". For example, when a zeroth RF voltage $V_{RF}0$ corresponding to "1" is inputted to the zeroth optical intensity modulator 301, a first RF voltage $V_{RF}1$ corresponding to "0" is inputted to the first optical intensity modulator 312, and a second RF voltage $V_{RF}2$ corresponding to "0" is inputted to the second optical intensity modulator 322, the receiving terminal may receive an optical signal indicating "001".

When a zeroth RF voltage $V_{RF}0$ corresponding to "0" is inputted to the zeroth optical intensity modulator 301, a first RF voltage $V_{RF}1$ corresponding to "1" is inputted to the first optical intensity modulator 312, and a second RF voltage $V_{RF}2$ corresponding to "1" is inputted to the second optical intensity modulator 322, the receiving terminal may receive an optical signal indicating "110".

Bit values may be assigned as in Table 1 for the eight-level optical signal, but the inventive concept is not limited thereto, and bit values corresponding to respective levels may vary.

As described in detail, the optical signal generating apparatus according to embodiments of the inventive concept may generate a multi-level optical signal by sequentially modulating optical signals through a plurality of optical intensity modulators operating on the basis of equal bias voltages $V_{bias}$ and RF voltages $V_{RF}$ of equal amplitudes.

Figure 10:
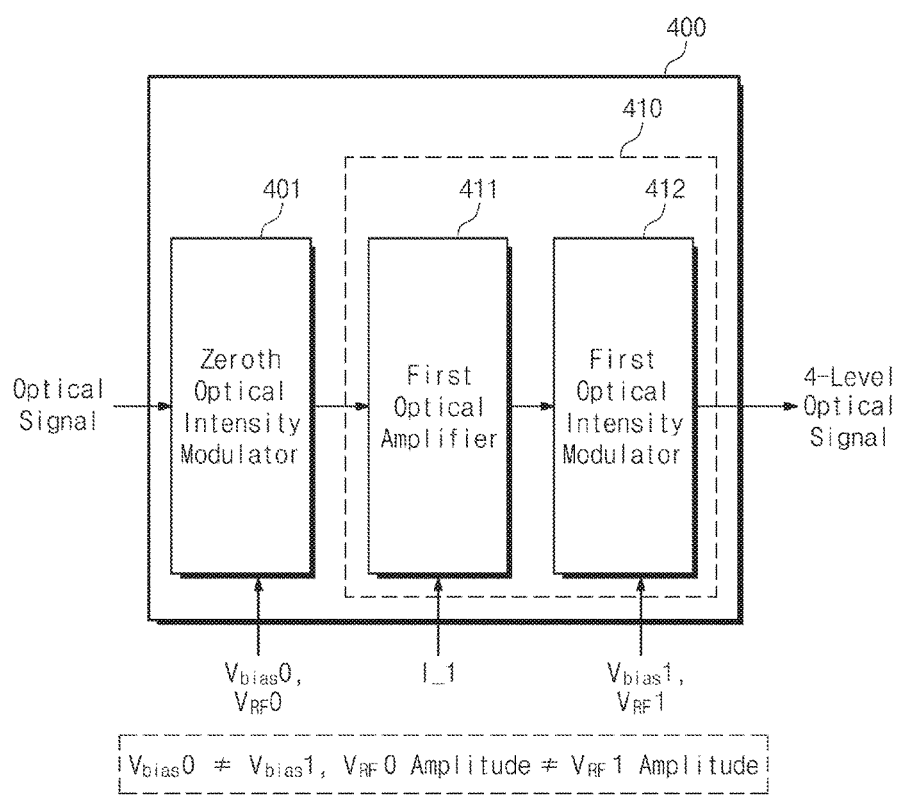
FIG. 10 is a block diagram illustrating an optical signal generating apparatus according to an embodiment of the inventive concept.

FIG. 10 is a block diagram illustrating an optical signal generating apparatus according to an embodiment of the inventive concept. Referring to FIG. 10, an optical signal generating apparatus 400 may receive an optical signal to output a four-level optical signal. The optical signal generating apparatus 400 may include a zeroth optical intensity modulator 401 and a binary signal generating unit 410. The binary signal generating unit 410 may include a first optical amplifier 411 and a first optical intensity modulator 412. Because the zeroth optical intensity modulator 401, the first optical amplifier 411 and the first optical intensity modulator 412 perform operations similar to those of the optical intensity modulators and the optical amplifiers described in FIGS. 1 to 4B, detailed description thereof will not be given.

The zeroth optical intensity modulator 401 may modulate an optical signal by using a zeroth bias voltage $V_{bias}0$ and a zeroth RF voltage $V_{RF}0$ as inputs, and the first optical intensity modulator 412 may modulate an optical signal by using a first bias voltage $V_{bias}1$ and a first RF voltage $V_{RF}1$ as inputs. As illustrated in FIG. 3B, when the bias voltages $V_{bias}$ applied to the zeroth and first optical intensity modulators 401 and 412 are different, and amplitudes of the RF voltages $V_{RF}$ applied thereto are different, optical signals having different optical intensity modulation widths may be generated.

The first optical amplifier 411 may receive a first current I_1, and amplify an optical signal received from the zeroth optical intensity modulator 401. The first optical amplifier 411 may amplify the optical signal while keeping an optical intensity modulation width equal. As illustrated in FIG. 4B, the first optical amplifier 411 may operate in a linear characteristic region to amplify the optical signal. Accordingly, the first current I_1 may be a current that causes the first optical amplifier 411 to operate in the linear characteristic region.

The first optical intensity modulator 412 may modulate an amplified two-level optical signal to generate a four-level optical signal. Accordingly, the optical signal generating apparatus 400 may output the four-level optical signal (i.e., a multi-level optical signal).

Figure 11:
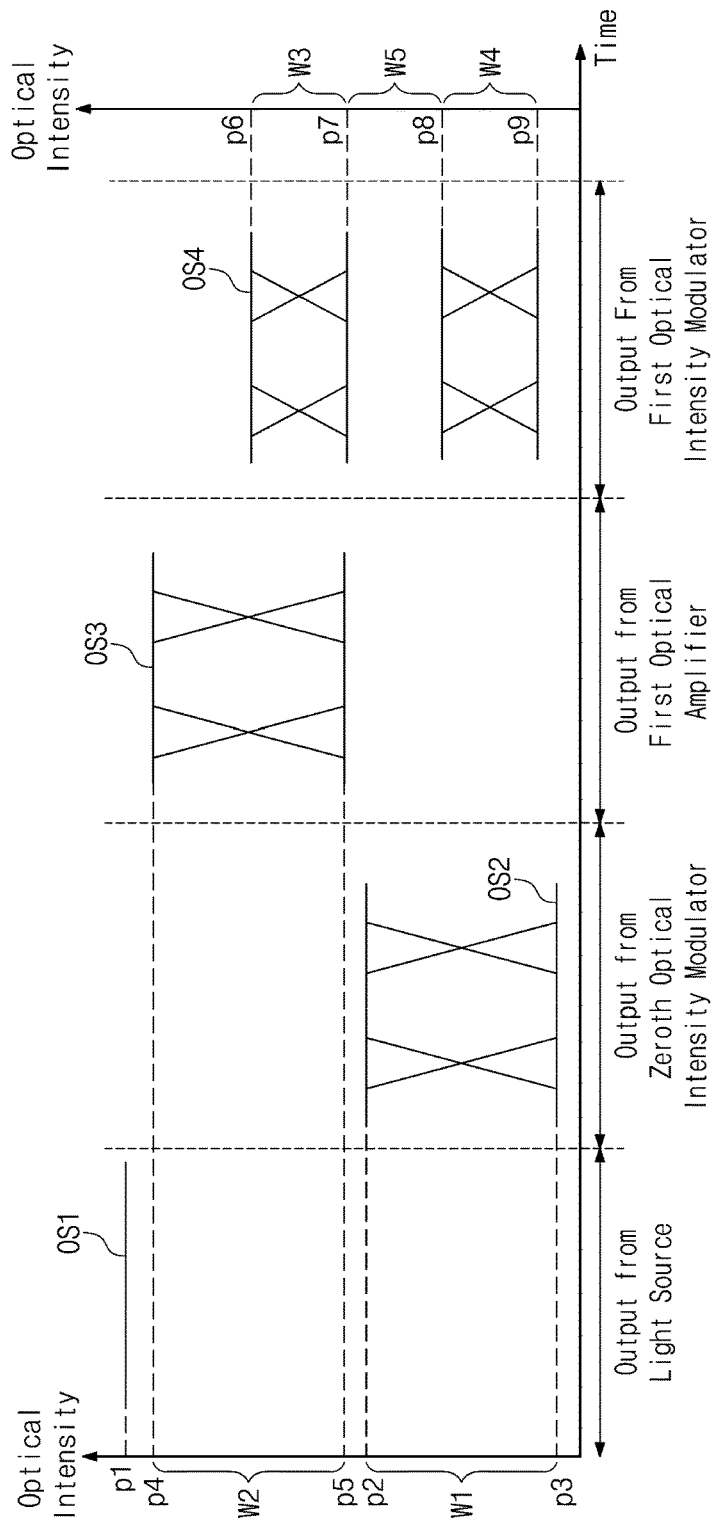
FIG. 11 illustrates, by way of example, an optical signal output of the optical signal generating apparatus illustrated in FIG. 10.

FIG. 11 illustrates, by way of example, an optical signal output of the optical signal generating apparatus illustrated in FIG. 10. A horizontal axis of FIG. 11 represents time and a vertical axis thereof represents optical intensity. Referring to FIGS. 10 and 11, the zeroth optical intensity modulator 401 may modulate a first optical signal OS1 to generate a second optical signal OS2. The zeroth optical intensity modulator 401 may generate a two-level second optical signal OS2 having a second optical intensity p2 and a third optical intensity p3 from a first optical signal OS1 having a first optical intensity p1. The zeroth optical intensity modulator 401 may generate the second optical signal OS2 having a first optical intensity modulation width W1, on the basis of the zeroth bias voltage $V_{bias}0$ and the zeroth RF voltage $V_{RF}0$.

The first optical amplifier 411 may amplify the second optical signal OS2 to generate a third optical signal OS3, on the basis of the first I_1. The third optical signal OS3 may be a two-level optical signal having a fourth optical intensity p4 and a fifth optical intensity p5. The first optical amplifier 411 may amplify the second optical signal OS2 so that the fourth optical intensity p4 of the third optical signal OS3 becomes equal to the first optical intensity p1 of the first optical signal OS1. A second optical intensity modulation width W2 of the third optical signal OS3 may be equal to the first optical intensity modulation width W1.

The first optical intensity modulator 412 may modulate the third optical signal OS3 to generate a fourth optical signal OS4, on the basis of the first bias voltage $V_{bias}1$ and the first RF voltage $V_{RF}1$. The fourth optical signal OS4 may be a four-level optical signal having a sixth optical intensity p6, a seventh optical intensity p7, an eighth optical intensity p8 and a ninth optical intensity p9. The first optical intensity modulator 412 may generate the fourth optical signal OS4 having the sixth optical intensity p6 and the seventh optical intensity p7 from the third optical signal OS3 having the fourth optical intensity p4. The first optical intensity modulator 412 may generate the fourth optical signal OS4 having the eighth optical intensity p8 and the ninth optical intensity p9 from the third optical signal OS3 having the fifth optical intensity p5. Accordingly, the first optical intensity modulator 412 may generate the four-level fourth optical signal OS4 from the two-level third optical signal OS3.

The first optical intensity modulator 412 may generate the fourth optical signal OS4 having a third optical intensity modulation width W3 and a fourth optical intensity modulation width W4 from the third optical signal OS3. The first optical intensity modulator 412 may modulate the third optical signal OS3 so that intervals between adjacent signal levels of the fourth optical signal OS4 are equal (i.e., the third optical intensity modulation width W3, the fourth optical intensity modulation width W4 and a fifth optical intensity modulation width W5 are equal.). For example, the intervals between the adjacent signal levels of the fourth optical signal OS4 may be equal by applying a first RF voltage $V_{RF}1$ having an amplitude half that of the zeroth RF voltage $V_{RF}0$.

As illustrated in FIG. 11, the optical signal generating apparatus 400 may generate a multi-level optical signal similarly to the optical signal generating apparatus 200 of FIG. 5, but may generate other form of multi-level optical signal.

Figure 12:
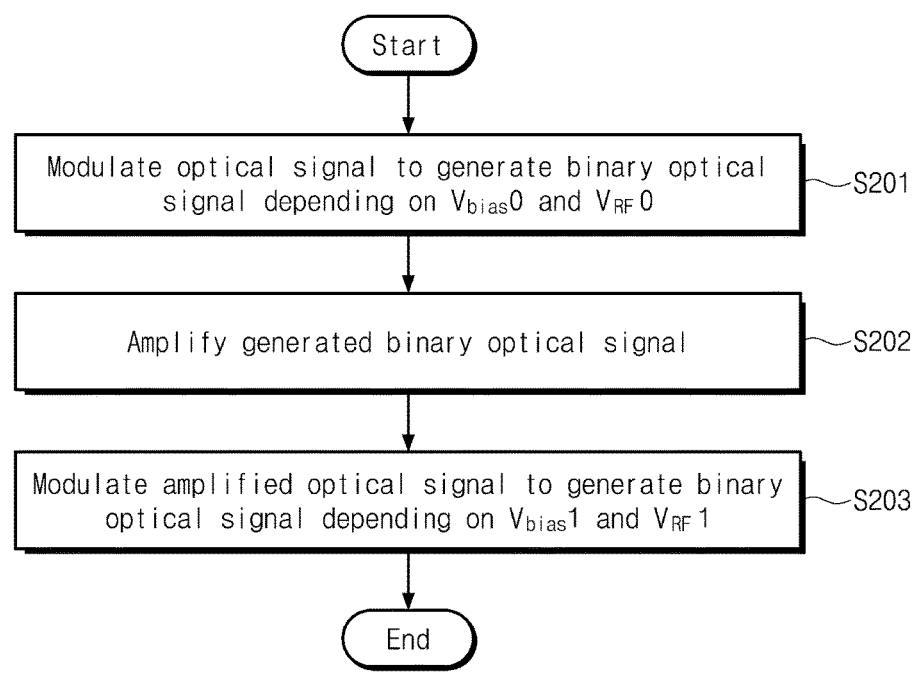
FIG. 12 is a flowchart illustrating an operating method of the optical signal generating apparatus illustrated in FIG. 10.

FIG. 12 is a flowchart illustrating an operating method of the optical signal generating apparatus illustrated in FIG. 10. In step S201, referring to FIGS. 10 and 12, an optical signal generating apparatus 400 may modulate, depending on a zeroth bias voltage $V_{bias}0$ and a zeroth RF voltage $V_{RF}0$, an optical signal to generate a binary optical signal. In step S202, the optical signal generating apparatus 400 may amplify the generated binary optical signal. In step S203, the optical signal generating apparatus 400 may modulate, depending on a first bias voltage $V_{bias}1$ and a first RF voltage $V_{RF}1$, the amplified binary optical signal to generate a multi-level optical signal. The first bias voltage $V_{bias}1$ may be different from the zeroth bias voltage $V_{bias}0$, and the amplitude of the first RF voltage $V_{RF}1$ may be different from that of the zeroth RF voltage $V_{RF}0$.

An operating method of the optical signal generating apparatus according to an embodiment of the inventive concept is not limited to that illustrated in FIG. 12, and the optical signal generating apparatus may generate an optical signal having more levels by repeating steps S202 and S203. For example, when steps S202 and S203 are performed N times, the optical signal generating apparatus may generate a $2^{N+1}$-level optical signal.

Figure 13:
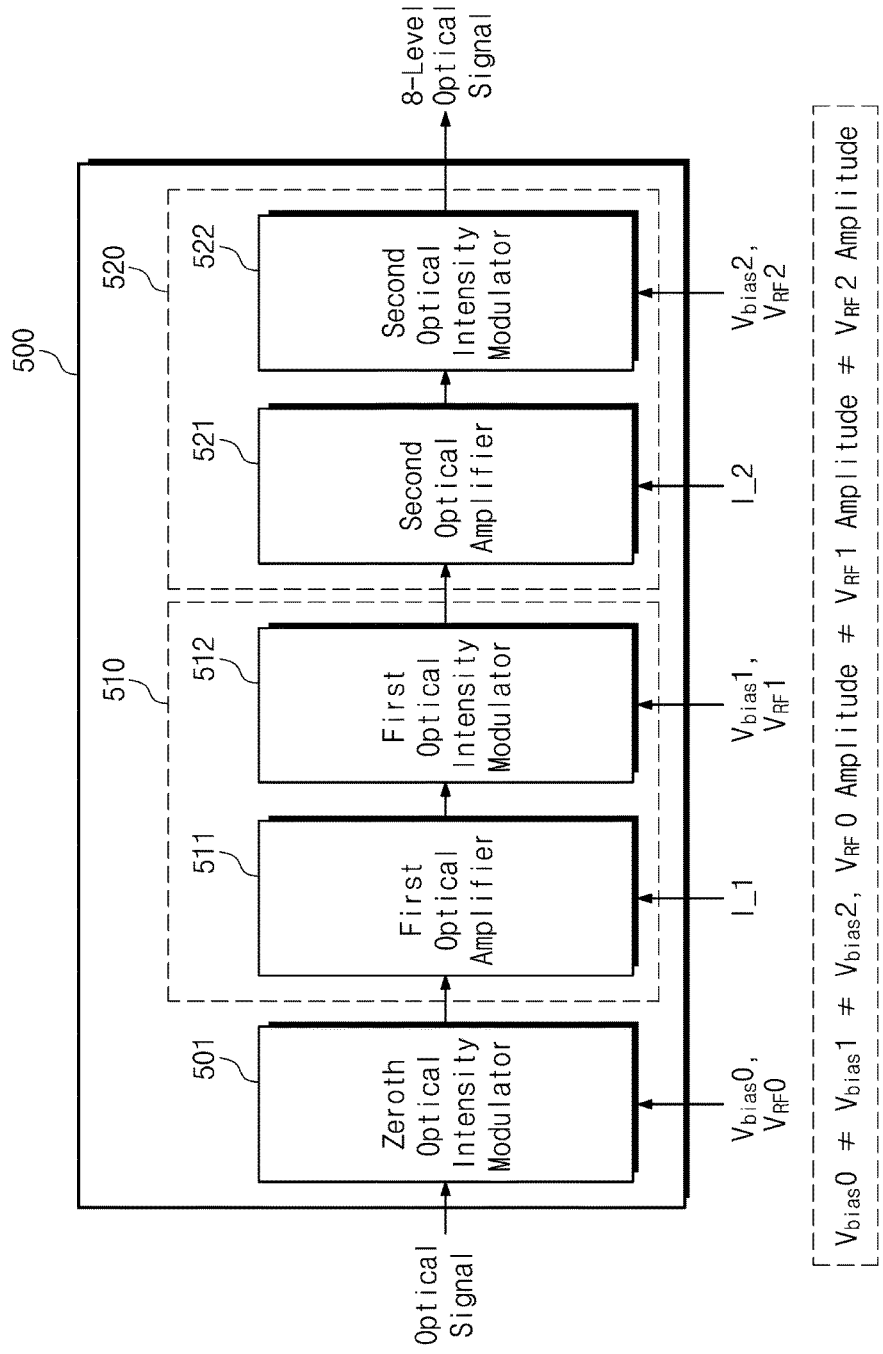
FIG. 13 is a block diagram illustrating an optical signal generating apparatus according to an embodiment of the inventive concept.

FIG. 13 is a block diagram illustrating an optical signal generating apparatus according to an embodiment of the inventive concept. An optical signal generating apparatus 500 may include a zeroth optical intensity modulator 501, a first binary signal generating unit 510 and a second binary signal generating unit 520. The first binary signal generating unit 510 may include a first optical amplifier 511 and a first optical intensity modulator 512, and the second binary signal generating unit 520 may include a second optical amplifier 521 and a second optical intensity modulator 522. Because operations of the zeroth optical intensity modulator 501 and the first binary signal generating unit 510 are similar to those of the zeroth optical intensity modulator 401 and the binary signal generating unit 410 of FIG. 10, detailed description will not be given.

The optical signal generating apparatus 500 may generate an eight-level optical signal through the zeroth optical intensity modulator 501, and the first and second binary signal generating units 510 and 520. Different bias voltages $V_{bias}0$ to $V_{bias}2$ and different RF voltages $V_{RF}0$ to $V_{RF}2$ may be applied respectively to the zeroth optical intensity modulator 501, and the first and second optical intensity modulators 512 and 522. For example, an amplitude of the first RF voltage $V_{RF}1$ inputted to the first optical intensity modulator 512 may be half that of the zeroth RF voltage $V_{RF}0$, and an amplitude of the second RF voltage $V_{RF}2$ inputted to the second optical intensity modulator 512 may be half that of the first RF voltage $V_{RF}1$. In other words, the magnitude of the amplitude of the RF voltage $V_{RF}$ inputted to the optical intensity modulator may be reduced at a constant rate compared with that of the RF voltage $V_{RF}$ inputted to the optical intensity modulator of a previous step.

A first current I_1 may be inputted to the first optical amplifier 511, and a second current I_2 may be inputted to the second optical amplifier 521. The first and second optical amplifiers 511 and 521 may respectively receive the first and second currents I_1 and I_2 to amplify optical signals.

Figure 14:
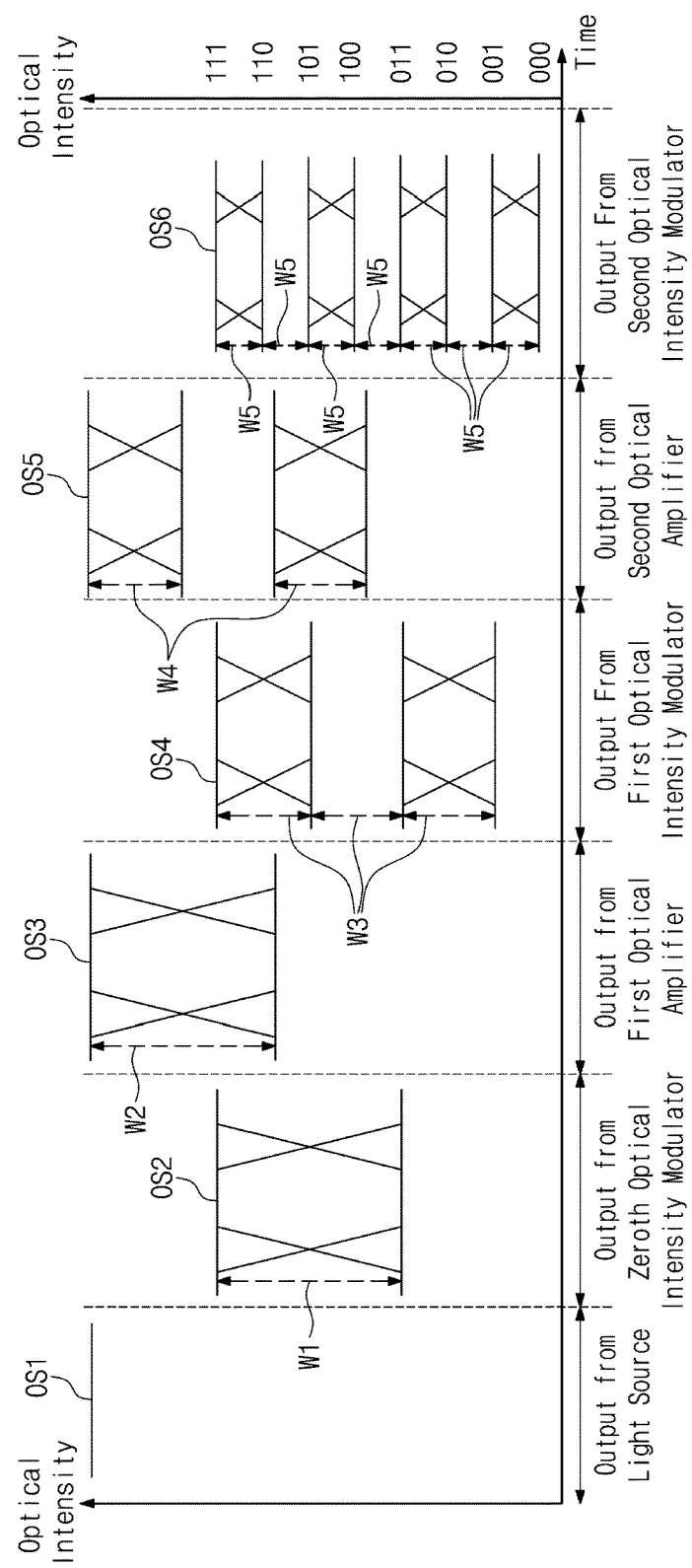
FIG. 14 illustrates, by way of example, an optical signal output of the optical signal generating apparatus illustrated in FIG. 13.

FIG. 14 illustrates, by way of example, an optical signal output of the optical signal generating apparatus illustrated in FIG. 13. A horizontal axis of FIG. 14 represents time and a vertical axis thereof represents optical intensity. Referring to FIGS. 13 and 14, the zeroth optical intensity modulator 501 may modulate, on the basis of the zeroth bias voltage $V_{bias}0$ and the zeroth RF voltage $V_{RF}0$, a first optical signal OS1 to generate a second optical signal OS2 having a first optical intensity modulation width W1.

The first optical amplifier 511 may amplify the second optical signal OS2 to generate a third optical signal OS3, on the basis of the first I_1. The third optical signal OS3 may have a second optical intensity modulation width W2 equal to a first optical intensity modulation width W1. By way of example, the highest-level optical intensity of the third optical signal OS3 may be equal to the optical intensity of the first optical signal OS1.

The first optical intensity modulator 512 may modulate, on the basis of the first bias voltage $V_{bias}1$ and the first RF voltage $V_{RF}1$, the third optical signal OS3 to generate a fourth optical signal OS4 having a third optical intensity modulation width W3. Intervals between adjacent signal levels of the fourth optical signal OS4 may be equal to the third optical intensity modulation width W3. For example, a first RF voltage $V_{RF}1$ having an amplitude half that of the zeroth RF voltage $V_{RF}0$ may be applied to the first optical intensity modulator 512 so that the intervals between the adjacent signal levels of the fourth optical signal OS4 may be equal.

The second optical amplifier 521 may amplify the fourth optical signal OS4 to generate a fifth optical signal OS5, on the basis of the second current I_2. The amplified fourth optical signal OS4 may have a fourth optical intensity modulation width W4 equal to the third optical intensity modulation width W3. By way of example, the highest-level optical intensity of the fifth optical signal OS5 may be equal to the highest-level optical intensity of the third optical signal OS3.

The second optical intensity modulator 522 may modulate, on the basis of the second bias voltage $V_{bias}2$ and the second RF voltage $V_{RF}2$, the fifth optical signal OS5 to generate a sixth optical signal OS6 having a fifth optical intensity modulation width W5. Intervals between adjacent signal levels of the sixth optical signal OS6 may be equal to the fifth optical intensity modulation width W5. For example, a second RF voltage $V_{RF}2$ having an amplitude half that of the first RF voltage $V_{RF}1$ may be applied to the second optical intensity modulator 522 so that the intervals between the adjacent signal levels of the sixth optical signal OS6 are equal.

The optical signal generating apparatus 500 may output the sixth optical signal OS6 generated from the second optical intensity modulator 522. The optical signal generating apparatus 500 may output an eight-level optical signal therefrom. The eight-level optical signal outputted from the optical signal generating apparatus 500 may indicate values corresponding to bits assigned as in FIG. 14 and the following Table 2.

TABLE 2

| Eight-level optical signal | Value of the zeroth RF voltage of the zeroth optical intensity modulator | Value of the first RF voltage of the first optical intensity modulator | Value of the second RF voltage of the second optical intensity modulator |
|---|---|---|---|
| 000 | 0 | 0 | 0 |
| 001 | 0 | 0 | 1 |
| 010 | 0 | 1 | 0 |
| 011 | 0 | 1 | 1 |
| 100 | 1 | 0 | 0 |
| 101 | 1 | 0 | 1 |
| 110 | 1 | 1 | 0 |
| 111 | 1 | 1 | 1 |

As in Table 2, when the eight-level optical signal is received from the optical signal generating apparatus 500, a receiving terminal may recognize a value indicated by the optical signal depending on the optical signal level as one of "000" to "111". For example, when a zeroth RF voltage $V_{RF}0$ corresponding to "0" is inputted to the zeroth optical intensity modulator 501, a first RF voltage $V_{RF}1$ corresponding to "0" is inputted to the first optical intensity modulator 512, and a second RF voltage $V_{RF}2$ corresponding to "1" is inputted to the second optical intensity modulator 522, the receiving terminal may receive an optical signal indicating "001".

When a zeroth RF voltage $V_{RF}0$ corresponding to "1" is inputted to the zeroth optical intensity modulator 501, a first RF voltage $V_{RF}1$ corresponding to "1" is inputted to the first optical intensity modulator 512, and a second RF voltage $V_{RF}2$ corresponding to "0" is inputted to the second optical intensity modulator 522, the receiving terminal may receive an optical signal indicating "110".

Bit values may be assigned as in Table 2 for the eight-level optical signal, but the inventive concept is not limited thereto, and bit values corresponding to respective levels may vary.

As described in detail, the optical signal generating apparatus according to embodiments of the inventive concept may generate a multi-level optical signal by sequentially modulating optical signals through a plurality of optical intensity modulators operating on the basis of bias voltages $V_{bias}$ different from each other and RF voltages $V_{RF}$ of amplitudes different from each other.

The optical signal generating apparatus according to embodiments of the inventive concept may generate a multi-level optical signal by sequentially performing optical modulation and optical amplification operations. That is, the optical signal generating apparatus according to embodiments of the inventive concept may generate a multi-level optical signal by arranging a plurality of optical intensity modulators in series. In the case of generating a multi-level optical signal by arranging a plurality of optical intensity modulators in parallel, a separate device may be required to combine optical signals outputted from respective optical intensity modulators. Accordingly, the optical signal generating apparatus according to embodiments of the inventive concept may generate a multi-level optical signal using only the optical intensity modulator and optical amplifier without a separate device to combine optical signals.

In addition, the optical signal generating apparatus according to embodiments of the inventive concept may generate a multi-level optical signal using an optical device without using a multi-level electrical signal. Accordingly, the optical signal generating apparatus according to embodiments of the inventive concept may generate a low-cost, high-quality optical signal.

The detailed description above is about specific embodiments for implementing the inventive concept. The inventive concept will include embodiments that are not only described above in detail, but also may be simply redesigned or easily changed. In addition, the inventive concept will also include techniques that may be readily modified and implemented using the embodiments. Therefore, the scope of the inventive concept is defined by the following claims or the equivalents other than the foregoing detailed description of the exemplary embodiments.

What is claimed is:

1. An optical signal generating apparatus comprising:
   a zeroth optical intensity modulator configured to modulate a first optical signal to generate a second optical signal in the form of a binary signal, a level of the second optical signal corresponding to one of two levels;
   a first optical amplifier configured to amplify the second optical signal to generate a third optical signal; and
   a first optical intensity modulator configured to modulate the third optical signal to generate a fourth optical signal, a level of the fourth optical signal corresponding to one of four levels,
   wherein each of the four levels corresponds to a different optical intensity.

2. The optical signal generating apparatus of claim 1, wherein
   the zeroth optical intensity modulator is configured to operate on the basis of a first bias voltage and a first RF voltage, and
   the first optical intensity modulator is configured to operate on the basis of a second bias voltage equal to the first bias voltage and a second RF voltage having an amplitude equal to an amplitude of the first RF voltage.

3. The optical signal generating apparatus of claim 1, wherein
an optical intensity modulation width of the fourth optical signal is equal to an optical intensity modulation width of the second optical signal.

4. The optical signal generating apparatus of claim 1, wherein
the first optical amplifier is configured to reshape the second optical signal so that an optical intensity modulation width of the third optical signal becomes one-half of an optical intensity modulation width of the second optical signal.

5. The optical signal generating apparatus of claim 1, wherein
the first optical amplifier operates on the basis of an input current, and
a magnitude of the input current corresponds to a magnitude of current that causes the first optical amplifier to operate in a nonlinear characteristic region.

6. The optical signal generating apparatus of claim 1, wherein
the zeroth optical intensity modulator is configured to operate on the basis of a first bias voltage and a first RF voltage, and
the first optical intensity modulator is configured to operate on the basis of a second bias voltage and a second RF voltage, the second bias voltage differing from the first bias voltage and the second RF voltage having an amplitude different from an amplitude of the first RF voltage.

7. The optical signal generating apparatus of claim 6, wherein
the amplitude of the second RF voltage is half the amplitude of the first RF voltage.

8. The optical signal generating apparatus of claim 1, wherein
the first optical amplifier operates on the basis of an input current, and
a magnitude of the input current corresponds to a magnitude of current that causes the first optical amplifier to operate in a linear characteristic region.

9. The optical signal generating apparatus of claim 1, wherein
the highest-level optical intensity of the third optical signal is equal to an optical intensity of the first optical signal.

10. The optical signal generating apparatus of claim 1, further comprising:
a second optical amplifier configured to amplify the fourth optical signal to generate a fifth optical signal; and
a second optical intensity modulator configured to modulate the fifth optical signal to generate a sixth optical signal, a level of the fifth optical signal corresponding to one of eight levels,
wherein each of the eight levels corresponds to a different optical intensity.

11. The optical signal generating apparatus of claim 10, wherein
the zeroth optical intensity modulator is configured to operate on the basis of a first bias voltage and a first RF voltage,
the first optical intensity modulator is configured to operate on the basis of a second bias voltage and a second RF voltage, and
the second optical intensity modulator is configured to operate on the basis of a third bias voltage and a third RF voltage,
wherein the first bias voltage, the second bias voltage, and the third bias voltage are equal, and the first RF voltage, the second RF voltage, and the third RF voltage have equal amplitudes.

12. The optical signal generating apparatus of claim 10, wherein
the first optical amplifier is configured to reshape the second optical signal so that an optical intensity modulation width of the third optical signal becomes one-half of an optical intensity modulation width of the second optical signal, and
the second optical amplifier is configured to reshape the fourth optical signal so that an optical intensity modulation width of the fifth optical signal becomes one-fourth of an optical intensity modulation width of the fourth optical signal.

13. The optical signal generating apparatus of claim 10, wherein
the zeroth optical intensity modulator is configured to operate on the basis of a first bias voltage and a first RF voltage,
the first optical intensity modulator is configured to operate on the basis of a second bias voltage and a second RF voltage, and
the second optical intensity modulator is configured to operate on the basis of a third bias voltage and a third RF voltage,
wherein the first bias voltage, the second bias voltage, and the third bias voltage are different from each other, and the first RF voltage, the second RF voltage, and the third RF voltage have amplitudes different from each other.

14. The optical signal generating apparatus of claim 13, wherein
an amplitude of the second RF voltage is one-half of an amplitude of the first RF voltage, and
an amplitude of the third RF voltage is one-half of an amplitude of the second RF voltage.

15. The optical signal generating apparatus of claim 1, wherein
each of the zeroth optical intensity modulator and the first optical intensity modulator is a Mach-Zehnder optical intensity modulator or an electro-absorption modulator.

16. An operating method of an optical signal generating apparatus, the operating method comprising:
modulating a first optical signal to generate a second optical signal, a level of the second optical signal corresponding to one of two levels;
amplifying the second optical signal to generate a third optical signal; and
modulating the third optical signal to generate a fourth optical signal, a level of the fourth optical signal corresponding to one of four levels,
wherein each of the four levels corresponds to a different optical intensity.

17. The operating method of claim 16, wherein
the first optical signal is modulated on the basis of a first bias voltage and a first RF voltage, and
the third optical signal is modulated on the basis of a second bias voltage and a second RF voltage, the second bias voltage being equal to the first bias voltage and the second RF voltage having an amplitude equal to an amplitude of the first RF voltage.

18. The operating method of claim 16, wherein
the first optical signal is modulated on the basis of a first bias voltage and a first RF voltage, and
the third optical signal is modulated on the basis of a second bias voltage and a second RF voltage, the second bias voltage differing from the first bias voltage and the second RF voltage having an amplitude different from an amplitude of the first RF voltage.

19. The operating method of claim 16, wherein
the second optical signal is amplified on the basis of an input current, and
a magnitude of the input current corresponds to a magnitude of current that causes an optical intensity modulation width of the third optical signal to differ from an optical intensity modulation width of the second optical signal.

20. The operating method of claim 16, wherein
the second optical signal is amplified on the basis of an input current, and
a magnitude of the input current corresponds to a magnitude of current that causes an optical intensity modulation width of the third optical signal to be equal to an optical intensity modulation width of the second optical signal.

* * * * *